United States Patent
Bearson et al.

(10) Patent No.: US 12,324,439 B2
(45) Date of Patent: *Jun. 10, 2025

(54) PRODUCTION OF PRECOOKED FORMED MEAT PATTIES

(71) Applicant: The Hillshire Brands Company, Chicago, IL (US)

(72) Inventors: Kent Bearson, Naperville, IL (US); Dejing Fu, Lisle, IL (US); Frederick Dorsey, Chicago, IL (US); Nicholas Miller, Downers Grove, IL (US); Liza John, Downers Grove, IL (US)

(73) Assignee: The Hillshire Brands Company, Chicago, IL (US)

( * ) Notice: Subject to any disclaimer, the term of this patent is extended or adjusted under 35 U.S.C. 154(b) by 723 days.

This patent is subject to a terminal disclaimer.

(21) Appl. No.: 17/705,852

(22) Filed: Mar. 28, 2022

(65) Prior Publication Data

US 2022/0217985 A1 Jul. 14, 2022

Related U.S. Application Data

(62) Division of application No. 16/937,911, filed on Jul. 24, 2020, now Pat. No. 11,284,628, which is a
(Continued)

(51) Int. Cl.
*A22C 7/00* (2006.01)
*A23B 4/005* (2006.01)
(Continued)

(52) U.S. Cl.
CPC .............. *A22C 7/0076* (2013.01); *A22C 7/00* (2013.01); *A22C 7/003* (2013.01); *A23B 4/005* (2013.01);
(Continued)

(58) Field of Classification Search
CPC ......... A22C 7/0076; A22C 7/00; A22C 7/003; A23L 13/52; A23L 13/67; A23L 5/10; A23B 4/005; A23B 4/06
(Continued)

(56) References Cited

U.S. PATENT DOCUMENTS 2,993,795 A 7/1967 Heuck
3,913,175 A 10/1975 Peterson
(Continued)

FOREIGN PATENT DOCUMENTS

| CN | 102920353 | 2/2013 | |
|---|---|---|---|
| GB | 2412561 | 10/2005 | |
| WO | WO-2008101733 A1 * | 8/2008 | ............ A23L 1/3177 |

OTHER PUBLICATIONS

S.G. Campano et al.; time and temperature controls, Reciprocal Meat Conference Proceedings, vol. 50, Jan. 1997, pp. 25-31, XP055435425.
(Continued)

*Primary Examiner* — John J Norton
*Assistant Examiner* — Dilnessa B Belay
(74) *Attorney, Agent, or Firm* — Duane Morris LLP

(57) ABSTRACT

A cold forming process for forming a meat patty includes heating a ground meat product to a temperature $T_1$, wherein $T_1 \leq 40°$ F. The ground meat product is formed into an uncooked patty at temperature $T_1$. The uncooked patty is precooked to form a precooked patty having a skin of depth D comprising denatured protein. The skin is formed on at least an area on the outside of the precooked patty. At least a first portion of the meat product disposed beneath said skin is at approximately $T_1$. The precooked patty is cooked to form a cooked patty, wherein said at least a first portion of the meat product is at a temperature $T_2$. The cooked patty is then frozen and then packaged.

25 Claims, 35 Drawing Sheets

Related U.S. Application Data division of application No. 16/081,591, filed as application No. PCT/US2016/031312 on May 6, 2016, now Pat. No. 11,980,200.

(60) Provisional application No. 62/302,013, filed on Mar. 1, 2016.

(51) Int. Cl.
*A23B 4/06* (2006.01)
*A23L 5/10* (2016.01)
*A23L 13/50* (2016.01)
*A23L 13/60* (2016.01)

(52) U.S. Cl.
CPC ........... *A23B 4/06* (2013.01); *A23L 5/10* (2016.08); *A23L 13/52* (2016.08); *A23L 13/67* (2016.08)

(58) Field of Classification Search
USPC .......................................................... 99/427
See application file for complete search history.

(56) References Cited

U.S. PATENT DOCUMENTS

| | | | |
|---|---|---|---|
| 4,121,509 A | 10/1978 | Baker et al. | |
| 4,193,167 A | 3/1980 | Orlowski et al. | |
| 4,229,859 A | 10/1980 | Gagliardi, Jr. et al. | |
| 4,516,291 A | 5/1985 | Goldberger et al. | |
| 5,037,350 A | 8/1991 | Richardson et al. | |
| 5,338,497 A | 8/1994 | Murray et al. | |
| 5,811,146 A | 9/1998 | Marra et al. | |
| 8,993,026 B2 | 3/2015 | Molnar et al. | |
| 9,554,593 B2 | 1/2017 | Righolt et al. | |
| 9,788,687 B2 | 10/2017 | Frehn et al. | |
| 2005/0013895 A1* | 1/2005 | Azzar | A23P 30/10 425/572 |
| 2005/0121437 A1 | 6/2005 | Spohn et al. | |
| 2012/0128839 A1 | 5/2012 | DaPuzzo | |
| 2013/0105470 A1 | 5/2013 | De Luca et al. | |
| 2014/0220196 A1 | 8/2014 | Veloo | |

OTHER PUBLICATIONS

The Big Thaw—Safe Defrosting Methods for Consumers (USDA) Dec. 22, 2015. Retrieved from the Internet on Jul. 7, 2016. URL: <https://web.archive.ort/ ... cation/get-answers/food-safety-fact-sheets/safe-food-handling/the-big-☐thaw-safe-defrosting-methods-for-consumers/CT Index>.

Production Information, Ground Beef (BeefU). Jul. 24, 2015. Retrieved from the Innternet on Jul. 8, 2016. URL: <https://web.archive.org/weg/20150724074800/http://www.beeffoodservice.com/CMDocs/BFS/BeefU/BeefUFactSheets/09_PI-Ground Beef. pdf>.

Livestrong N PL, published Mar. 6, 2012, https://web.archive.org/web/20120306200307/https://www.livestrong.com/article/552635-cooking-burgers-in-the-oven-after-grilling/ (Year: 2012).

* cited by examiner

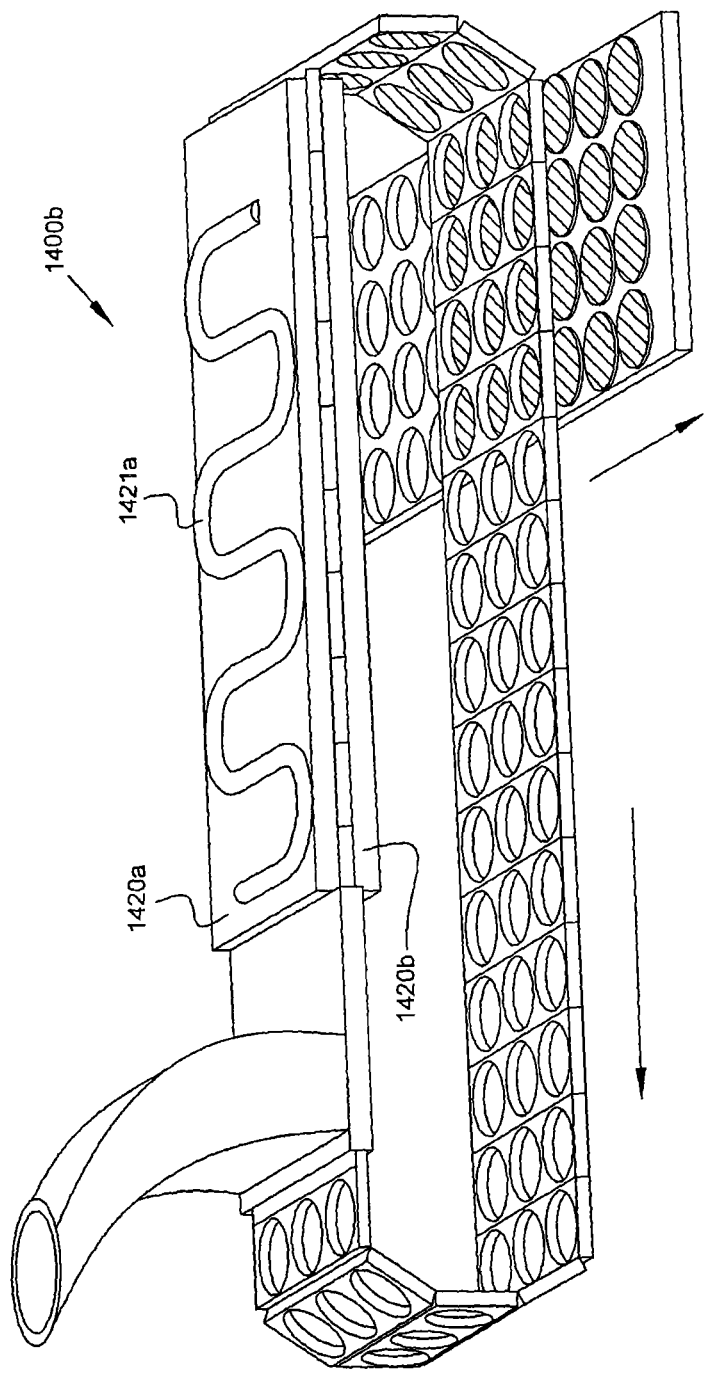

PRODUCTION OF PRECOOKED FORMED MEAT PATTIES

CROSS REFERENCE TO RELATED APPLICATIONS

This application is a divisional application of, and claims priority benefit to, U.S. patent Application No. 16,937,911, entitled "PRODUCTION OF PRECOOKED FORMED MEAT PATTIES," filed on Jul. 24, 2020 and issues as U.S. Pat. No. 11,284,628 on Mar. 29, 2022, which is a divisional application of, and claims priority benefit to, U.S. application Ser. No. 16/081,591 entitled "SYSTEM AND METHOD FOR PRODUCING FORMED MEAT PATTIES" and filed on Aug. 31, 2018, which claims priority benefit to, and is a national stage application of, PCT Application No. PCT/US16/31312 entitled "SYSTEM AND METHOD FOR PRODUCING FORMED MEAT PATTIES" and filed on May 6, 2016, which claims priority benefit to U.S. Provisional Patent Application No. 62/302,013 entitled "SYSTEMS AND METHODS FOR PRODUCING A PRECOOKED SLICED MEAT PRODUCT" and filed on Mar. 1, 2016, the entirety of each is hereby incorporated herein by reference.

FIELD

The present disclosure relates generally to the field of precooked food products, and more specifically, to systems and methods for producing precooked formed meat patties.

BACKGROUND

Precooked meat products are very popular in today's fast-paced world. For example, it is convenient to be able to quickly prepare a meal using meat patties (e.g., frozen meat patties) that have already been cooked previously and packaged. Various techniques are known for producing and packaging meat patties. Such techniques typically involve numerous processing steps, some of which are relatively time-consuming and/or require substantial manual labor.

Due to the labor-intensive manufacturing process, high-quality precooked meat patties are difficult to manufacture. Some prior attempts to simplify or expedite the meat patty production process have encountered difficulties due to physical characteristics of the meat (e.g., consistency of the meat and its ability to withstand processing without disintegrating) or considerations relating to the end consumer (e.g., taste and/or texture of the patties). It is desirable to simplify, automate, and/or expedite manufacturing of meat patties while improving the quality of the patties.

SUMMARY

In some embodiments, a warm forming process for forming a meat patty includes heating an uncooked ground meat product to a temperature $T_1$, wherein $T_1 > 32°$ F. The uncooked ground meat product is formed into an uncooked patty at temperature $T_1$. The uncooked patty is precooked to form a precooked patty having a skin of depth D comprising denatured protein. The skin is formed on at least an area on the outside of the precooked patty. At least a first portion of the meat product disposed beneath said skin is at approximately $T_1$. The precooked patty is cooked to form a cooked patty, wherein said at least a first portion of the meat product is at a temperature $T_2$, The cooked patty is then frozen and then packaged.

In some embodiments, a cold forming process for forming a meat patty includes coarse grinding a meat product. The coarse ground meat product is blended with first ingredients to a temperature $T_1$ wherein $T_1 < 40°$ F. The process includes fine grinding the blended meat product and forming the ground meat product into an uncooked patty at $T_1$. The uncooked patty is cooked to form a precooked patty having a skin of depth D comprising denatured protein, wherein said skin is formed on at least an area on the outside of the precooked patty at a temperature $T_2$, and wherein at least a first portion of the meat product disposed beneath said skin is at approximately temperature $T_1$, and wherein $T_2 > T_1$. The precooked patty is chilled and then packaged.

BRIEF DESCRIPTION OF THE DRAWINGS

FIGS. 14A-14C are illustrations of a technique for forming and precooking meat patties in accordance with some embodiments. 14A: top perspective view; 14B: bottom perspective view; 14C: top perspective view with dual heat jackets.

DETAILED DESCRIPTION

Figure 1:
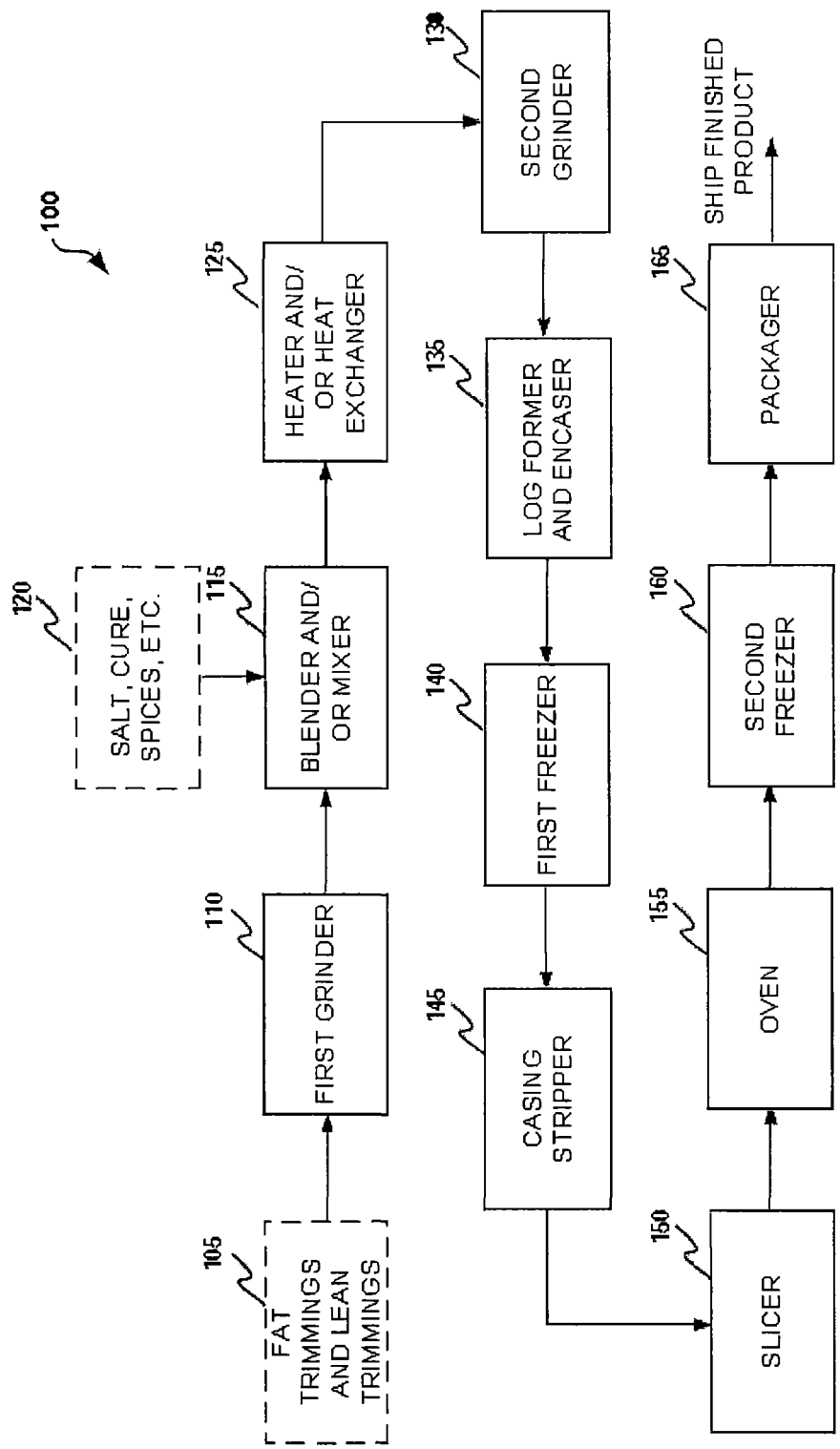
FIG. 1 is a block diagram of a conventional system for producing a precooked meat patty.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "vertically," "downwardly," "upwardly," etc.) should be construed to refer to the orientation as then described or as shown in the drawing under discussion. These relative terms are for convenience of description and do not require that any apparatus or process be constructed, operated, or performed in a particular orientation.

Various embodiments of the present disclosure relate to new systems and methods for producing meat patties. Efficiencies are achieved in terms of time, space, and/or resource requirements compared to prior meat patty production techniques. For example, some systems and methods reduce or eliminate manual labor during the patty production process, thereby speeding up the end-to-end process and/or reducing energy expenditure. In some embodiments, ground meat patties are produced with a crumbly texture that is pleasing to consumers.

FIG. 1 is a block diagram of a conventional system 100 for producing a precooked sliced meat product. Fat trimmings and lean trimmings 105 are added to a first grinder 110 and coarsely ground to about ⅜ to ⅝ of an inch. The ground meat is transferred from the first grinder 110 to a blender and/or mixer 115 and combined with other ingredients 120 such as salt, cure, spices, and other flavorings. After being blended and/or mixed to form a coarsely ground meat mixture, the coarsely ground meat mixture is transferred to a heater and/or heat exchanger 125 (referred to as a heater for convenience) and heated to 50-100° F. The heated meat mixture is then transferred to a second grinder 130 and more finely ground to about 3/32 to ⅛ of an inch.

The finely-ground heated meat mixture is then transferred to a log former and encaser 135. The log former and encaser 135 forces the finely-ground heated meat mixture into plastic casings to form logs of predetermined diameter such that, after cooking, slices of the logs cut perpendicular to the center axis of the logs are of the desired diameter for the final fully cooked product.

After the encased logs are formed, they are loaded into a first freezer 140, to be fully frozen. This is done to accommodate later slicing since the raw meat logs cannot easily be sliced even when chilled to be somewhat firm, such as raw cased sausages bought at a grocery store. The large logs may take up to 48 hours to freeze fully to be sliced properly.

After being frozen in the first freezer 140, the logs are stripped of the casings by a stripper 145. Stripper 145 may be a combination of a casing cutter that cuts the casing along a length of the log, and a worker that manually strips the casing from the log. This manual stripping process is slow and tedious. The stripped logs are then manually placed in a slicer 150.

Slicer 150 is able to slice the frozen logs using a band saw blade or a solid metal blade. Since the logs are frozen, the slices generally retain their shape while being sliced. This would not be the case if the logs were not frozen prior to slicing. There will be some significant loss of meat during the slicing process, about 3-6%.

The sliced frozen meat patties are then transferred to an oven 155 where they are fully cooked to a temperature of above 165° F. The fully cooked patties are then transferred to a second freezer 160 to be frozen a second time. The frozen patties are then bulk packed.

The total length of time to complete the processing of the fully cooked meat product using the system 100, from grinding the fat trimmings and trimmings 105 to packaging the frozen patties with the packager 165, can take multiple days. Additionally, such a process is labor-intensive, particularly if casings are stripped manually and stripped logs are manually placed in slicer 150.

Figure 2:
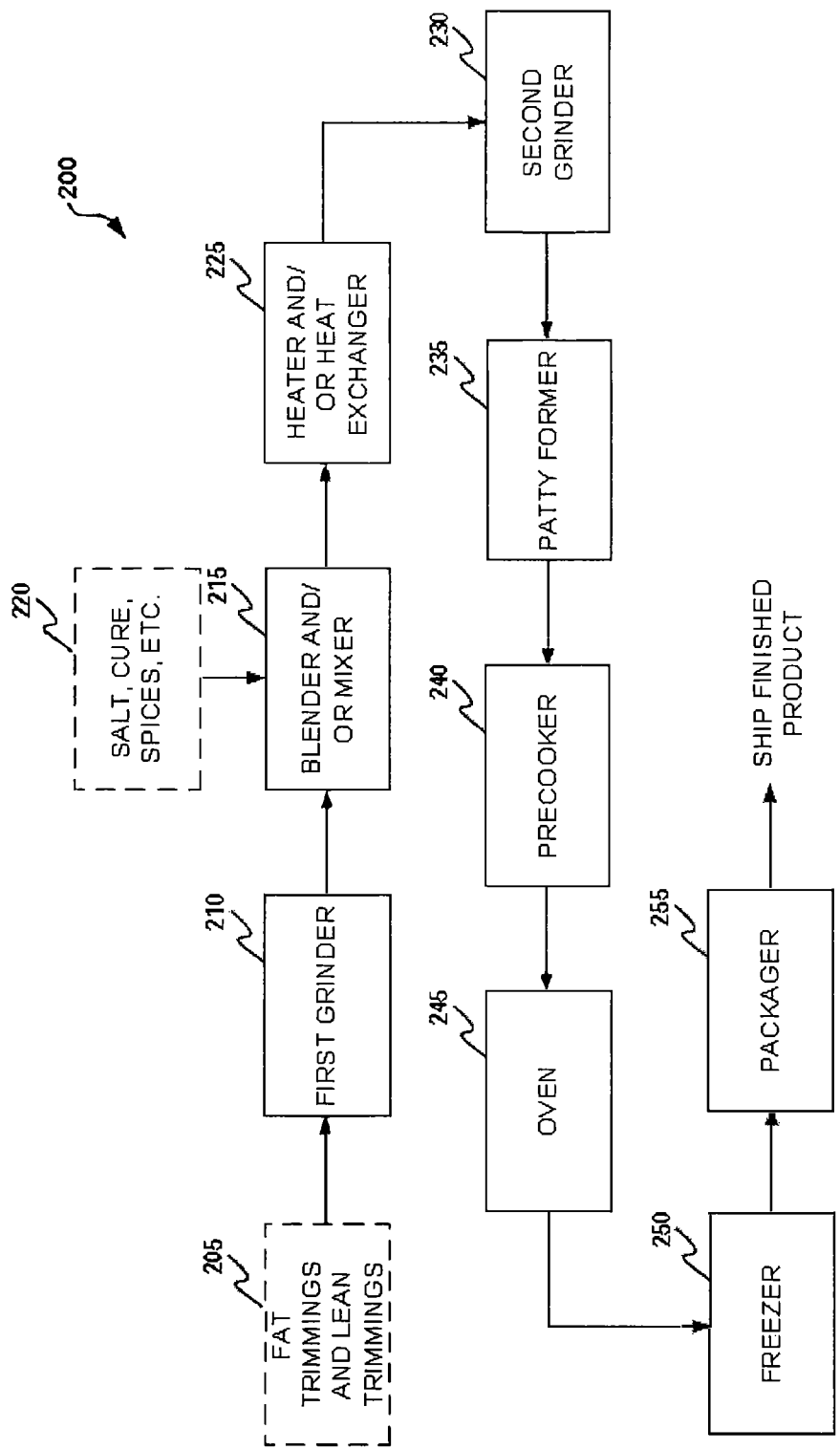
FIG. 2 is a block diagram of a system for producing a precooked meat patty product in accordance with some embodiments of the present disclosure.

FIG. 2 is a block diagram of a system 200 for producing a precooked meat patty product in accordance with some embodiments of the present disclosure. The meat patty may correspond to any kind of meat, e.g., chicken, beef, turkey, pork, or any combination thereof. Fat trimmings and lean trimmings 205 are ground in a first grinder 210, combined with other ingredients 220 in a blender and/or mixer 215, and heated in a heater 225 (e.g., to a temperature greater than 32° F., in some cases to a temperature between 35-110° F., and in some cases to a temperature simulating a pre-rigor state, such as 90° F.). The temperature to which the meat is heated may depend on the type of meat. In some examples, for chicken, beef, turkey, and/or combinations thereof, the meat is heated at heater and/or heat exchanger 225 to between 30-50° F. In other examples, for pork, beef, turkey, and/or combinations thereof, the meat is heated at heater and/or heat exchanger 225 to between 40-75° F. In yet other examples, the meat includes pork and is heated at heater and/or heat exchanger 225 to between 76-110° F. Optionally, the meat is then finely ground in a second grinder 230. Instead of using a log former/encaser 135, first freezer 140, casing stripper 145, and slicer 150, patties are formed at patty former 235 and precooked at precooker 240. Various example implementations of patty formation and precooking are described below.

Patty former 235 fills patty molds with finely-ground meat from the second grinder 230 without the need for forming encased logs of meat product, freezing the logs, and then slicing the frozen encased meat logs. Because the meat is heated at heater and/or heat exchanger 225, e.g., to a temperature above 32° F., this technique for forming patties is referred to as a warm formation process. In other embodiments, heating is not performed prior to patty formation (e.g., the heater and/or heat exchanger 225 is eliminated), and such a process is referred to as a cold formation process.

By replacing the log forming/encasing, freezing, stripping, and slicing steps of the prior process 100, the total time for forming and cooking the meat patties may be reduced from two days to about two hours or less, resulting in cost savings and increased yield.

After the heated finely-ground meat has been directed into the patty molds by the patty formers 235, precooker 240 sears at least one side, and in some implementations both sides, of the formed patties such that they are able to be removed from the patty molds and remain intact during the entire precooking process. Without such searing, the formed patties may have a consistency that is similar to oatmeal which would complicate subsequent processing, e.g., because the formed patties may have a tendency to break apart when removed from patty molds. Precooking the formed patties causes the patties to have a skin including denatured proteins. The skin is formed on at least an area on the outside of the precooked patties. At least a portion of the meat product beneath the skin is at approximately the temperature to which the patties were heated by heater and/or heat exchanger 225 (or at approximately the temperature of the output of the second grinder 230 for the cold formation process).

In one embodiment, precooker 240 comprises at least one infrared oven. Other examples of heating techniques that may be used at precooker 240 include inductive heating, steam conduction heating, electric conduction heating, thermal oil conduction heating, application of a hot water shower, hot water spray, application of another hot liquid that sets the surface protein on contact, and combinations thereof. In an embodiment, precooker 240 may produce a heat on the order of about 550° F. to about 600° F., depending on the size of the patties. At such high temperatures, the precooking/searing may take about 30 to 60 seconds to precook the patties. The time duration for precooking may be a function of the species of the meat, the thickness of the patty, the temperature of the precooking/searing, and/or the precooking/searing method employed. With sufficient heat applied to the surface of the meat, the protein will typically denature in seconds, forming a skin of denatured protein at the surface Details of examples of precooker 240 are described below.

After precooking/searing the patties such that the patties remain intact when released from the patty form molds, the patties are fully cooked in an oven 245. Oven 245 may be an impingement oven or other type of oven, heat application device, a water bath, or oil bath (fry), for example. Oven 245 cooks the patties to a high temperature (e.g., 150-180° F., and in some cases any temperature over 165° F.) such that the meat patties have been fully cooked and are appropriate for human consumption. Thus, in some examples, the temperature of the portion of the meat product below the skin is raised from between 32-110° F. to between 150-180° F. Because the patties were not frozen prior to being cooked in precooker 240 and oven 245, the total cooking process time is reduced compared to prior system 100.

The fully-cooked patties are transferred from oven 245 to a freezer 250 to be frozen. When the patties have been frozen, they are bulk packed or packed for shipment at packager 255.

Figure 3:
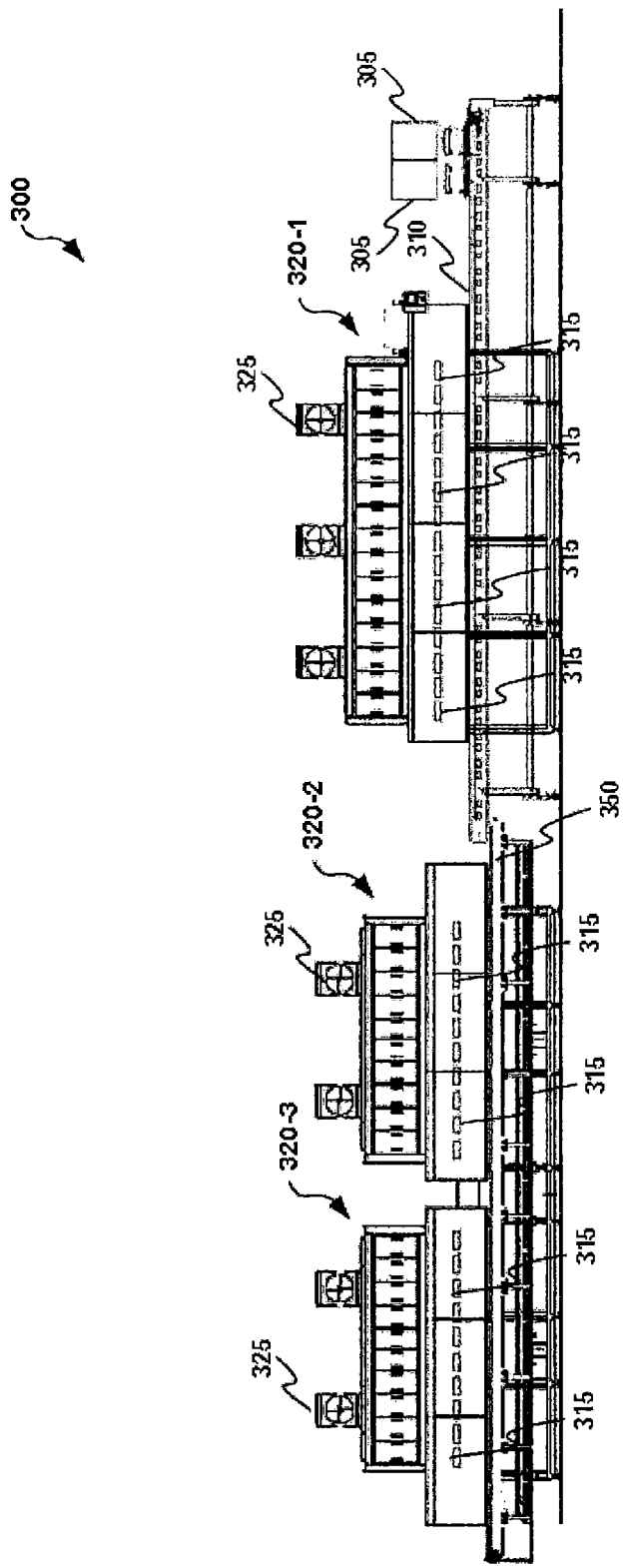
FIG. 3 is a side view of an example system for forming and precooking meat product patties in accordance with some embodiments.
Figure 4:
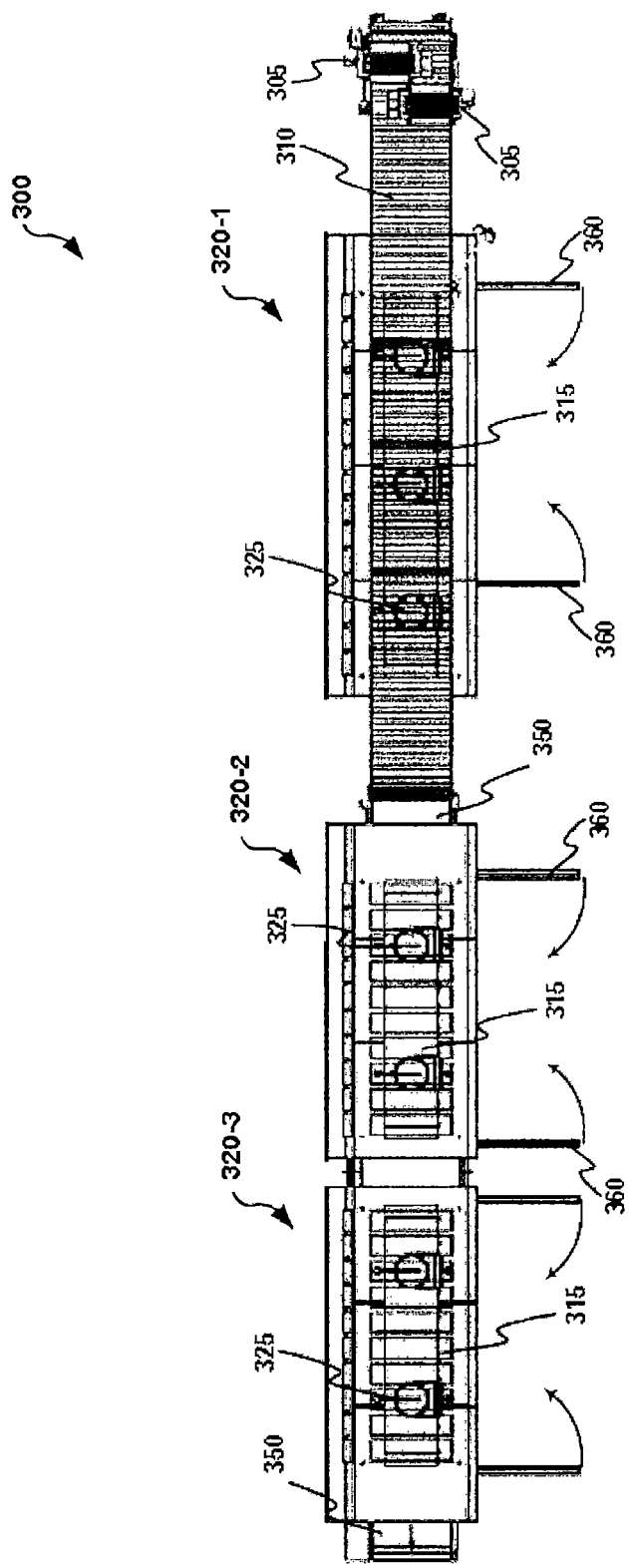
FIG. 4 is a top view of the system of FIG. 3.

FIGS. 3 and 4 are side and top views, respectively, of an example patty forming and precooking system 300 that may be used as the patty former 235 and precooker 240 in system 200 (FIG. 2). In FIG. 3, the process flows from right to left. Upstream of the patty formers 305 (to the right of patty formers 305 in the side view of FIG. 3) are the heater and/or heat exchanger 225 (e.g., a scrape surface heat exchanger for the warm formation process), and the second grinder 230 (e.g., an inline grinder) that forms the final grind as described above with reference to FIG. 2.

At the far right side of the patty forming and precooking system 300 are two patty formers 305 that receive heated (e.g., at pre-rigor temperature) meat, for the warm formation process, from the second grinder 230 (not shown in FIGS. 3 and 4). A pan conveyor 310 moves a plurality of form pans under the patty formers 305. The patty formers 305, details of which are described below, fill patty form molds in the form pans with the heated ground meat. The pan conveyor 310 conveys the filled form pans under a first infrared oven 320-1. The first infrared oven 320-1 includes a plurality of infrared burners 315 that are located above the pan conveyor 310. The infrared burners 315 or pan conveyors 310 are capable of being moved vertically in order to achieve the desired temperature and intensity during precooking of the patties in the form pans.

As the form pans are conveyed by pan conveyor 310 through the first infrared oven 320-1, infrared burners 315 precook/sear the meat patties in the patty form molds from the top. Sufficient heat is applied to patties to sear the surface, and during this process product fat melts, which assists with patty release. Additional heat sources might be required on the bottom of the pan in the case of some products to release patties. An induction coil may be used as such an additional heat source, with other examples being a gas flame, thermal coil, or steam coil.

Figure 10:
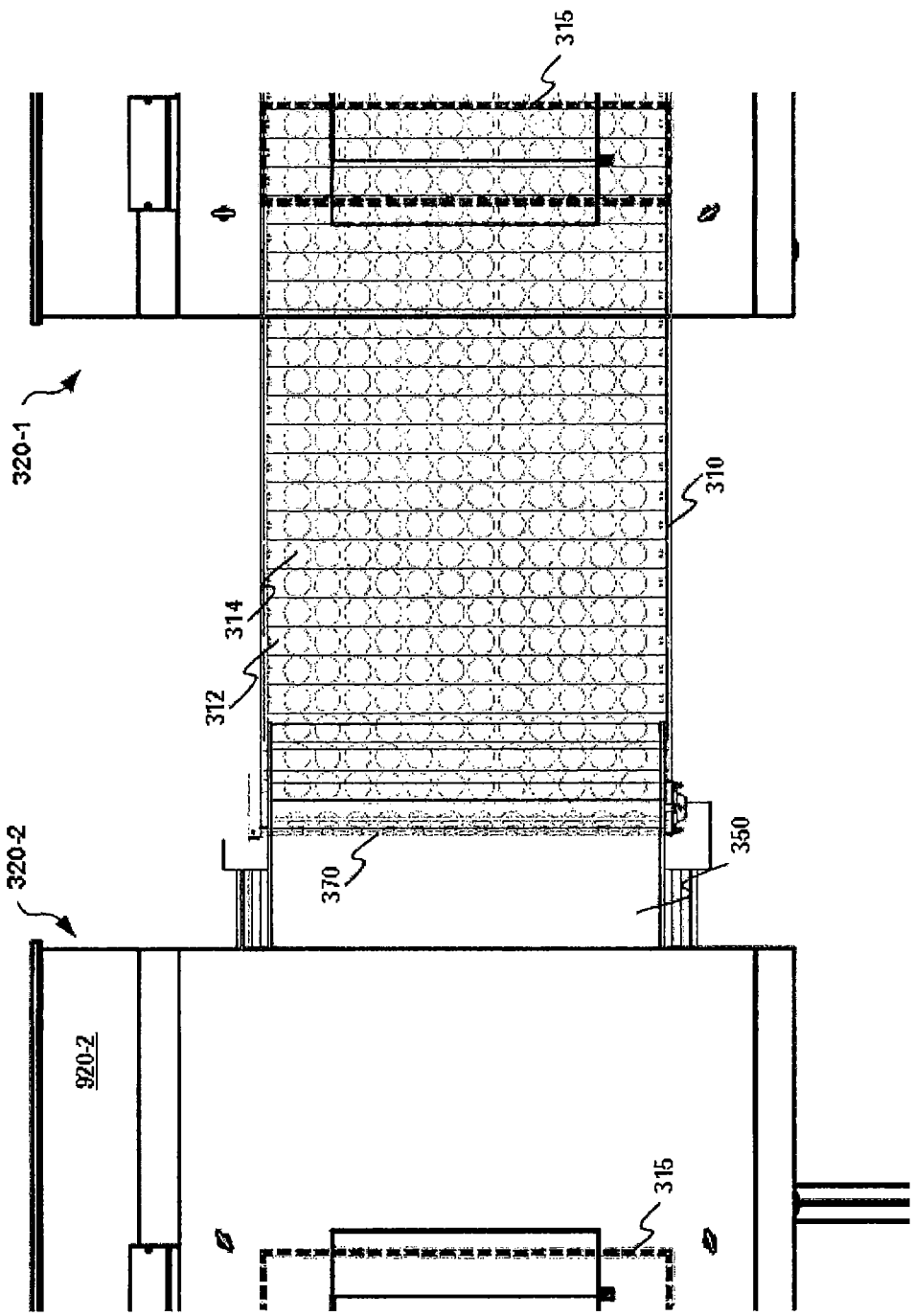
FIG. 10 is a top view of a patty flipping portion between the pan conveyor and a patty conveyor of the system of FIGS. 3 and 4.

In some embodiments, when the form pans reach the far left side of the pan conveyor 310, the form pans are rotated around the left side of the pan conveyor 310, causing the partially precooked patties to fall from the form pans of the pan conveyor 310 onto a patty conveyor 350 such that the bottom of the patties in the form pans are flipped up to be conveyed by the patty conveyor 350 through a second infrared oven 320-2 and a third infrared oven 320-3. FIG. 10 is a top view that shows how form pans 312 of pan conveyor 310 move (from right to left in FIG. 10). Referring back to FIGS. 3 and 4, infrared burners 315 in the second and third infrared ovens 320-2 and 320-3 then precook/sear the second side of the meat patties from above. The infrared heat provides a relatively uniform brownness and retains the shape of the meat. The use of the first infrared oven 320-1 to cook/sear a first side along with the second and third infrared ovens 320-2 and 320-3 to cook/sear the second side provides even browning on both sides of the patties. This infrared heating process assists with patty release and also establishes the shape of the patty. Temperature of the patties exiting the infrared section may be in the range of 100° F.-160° F.

Thus, in some embodiments, precooker 240 (FIG. 2) includes a first conveyor (pan conveyor 310), heating element for heating a first side of each patty, a flipper (e.g., the curved end portion of pan conveyor 310), a second conveyor (patty conveyor 350), and a heating element for heating the second side of each patty. By precooking/searing the first side of the patty, a skin including denatured protein is formed on at least a portion of that first side. Then, by precooking/searing the second side of the patty, a skin including denatured protein is formed on at least a portion of that second side. The depth of the skin formed on the first side may be the same as or different than the depth of the skin formed on the second side. The skin formed on each side makes the patty less likely to break apart during subsequent processing or when grasped.

In some embodiments, infrared ovens 320 have multiple exhaust fans 325 that are used to control the temperature of the infrared ovens 320. After the meat patties are conveyed through the second and third infrared ovens 320-2 and 320-3, they are transferred to another oven (not shown in FIGS. 3 and 4) for final cooking, e.g., oven 245 described above in reference to FIG. 2.

Pan conveyor 310 and patty conveyor 350, as shown in FIG. 4, may be mounted on rotating rails 360 such that the conveyors 310 and 350 may be moved away from the infrared ovens 320 to allow servicing of the infrared ovens 320 and/or cleaning of pan conveyor 310 and patty conveyor 350.

Figure 5:
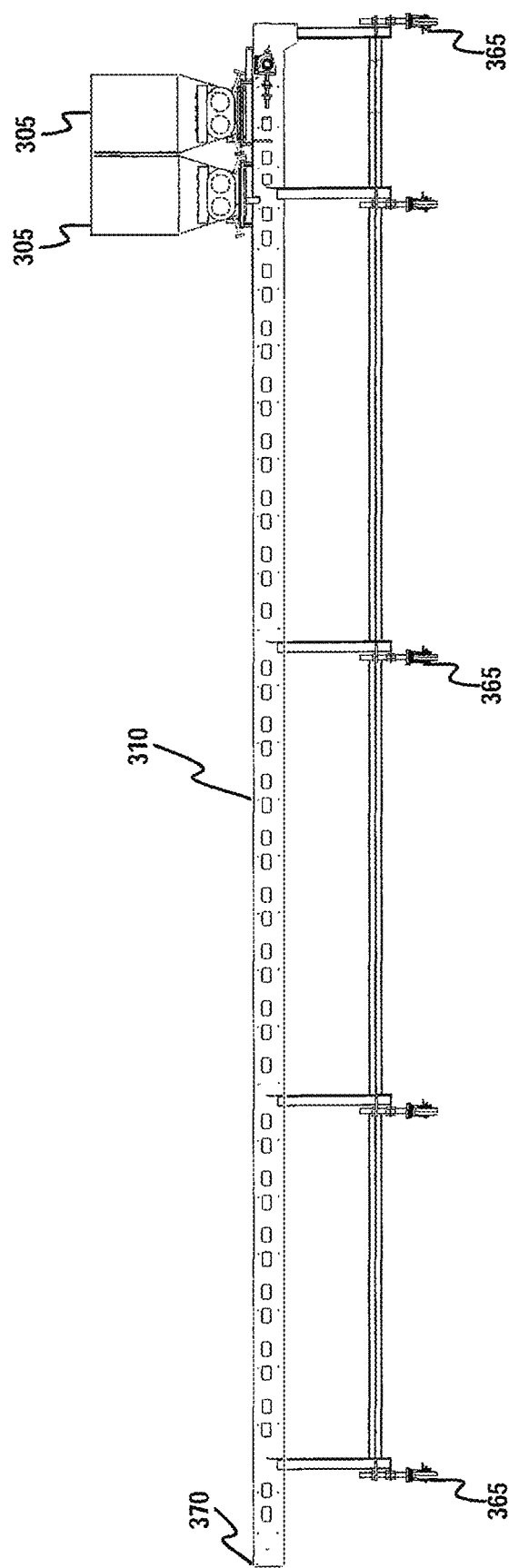
FIG. 5 is a side view of two patty formers and a pan conveyor of the system of FIGS. 3 and 4.

Referring to FIG. 5, a side view of pan conveyor 310 shows rollers 365 that assist in the moving of pan conveyor 310 and all related equipment along rotating rails 360. Rotating rails 360 can rotate from a position perpendicular to the conveyors to positions parallel to the conveyors such that workers do not trip over rotating rails 360.

FIG. 5 shows an enlarged view of a patty flipping portion 370 where pan conveyor 310 rotates around such that the form pans turn vertical (see far left end of pan conveyor 310 in FIG. 10) and then further rotate under pan conveyor 310, causing the patties to flip out of the patty molds of the form pan and onto patty conveyor 350. The relative height between pan conveyor 310 and patty conveyor 350 is controlled to ensure that the patties are rotated during flipping in such a way that all or substantially all of the patties land with the top side (i.e., the side that was facing upwards while on pan conveyor 310) on patty conveyor 350 and with the side that was touching the form pans (i.e., the side that was facing downwards while on pan conveyor 310) facing upwards when on patty conveyor 350.

Figure 6:
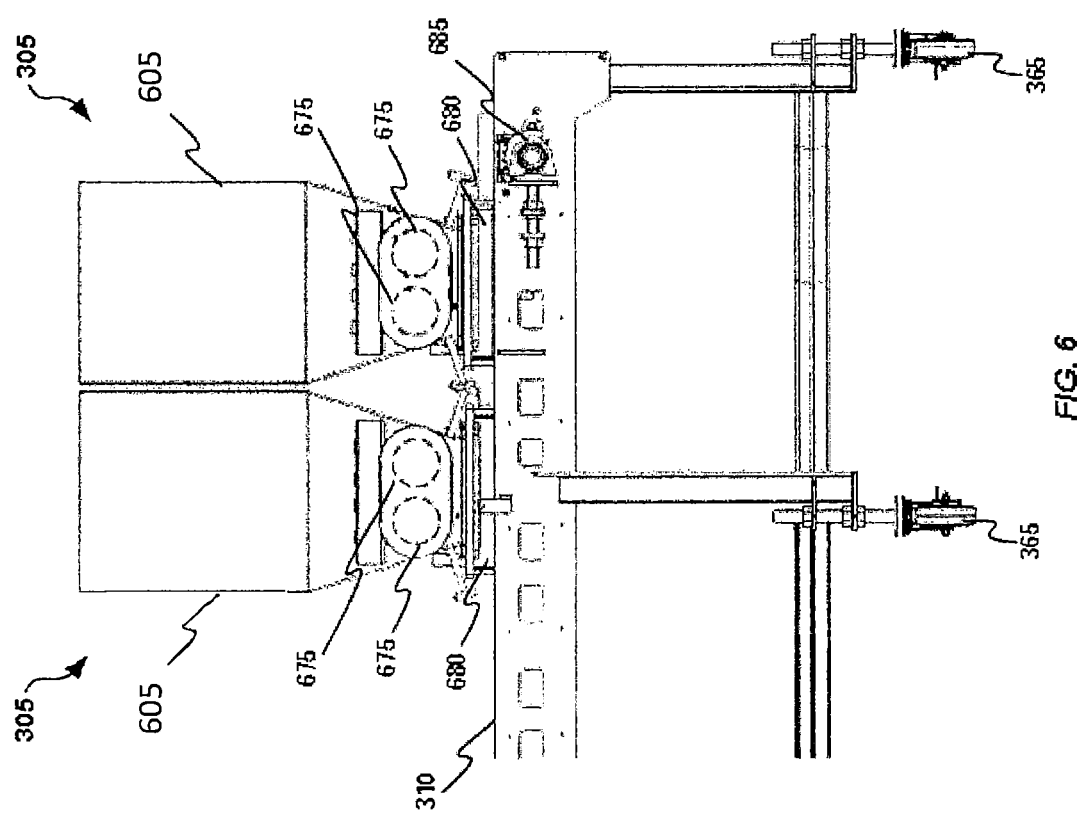
FIG. 6 is another side view of the two patty formers and the pan conveyor of FIGS. 3-5.
Figure 7:
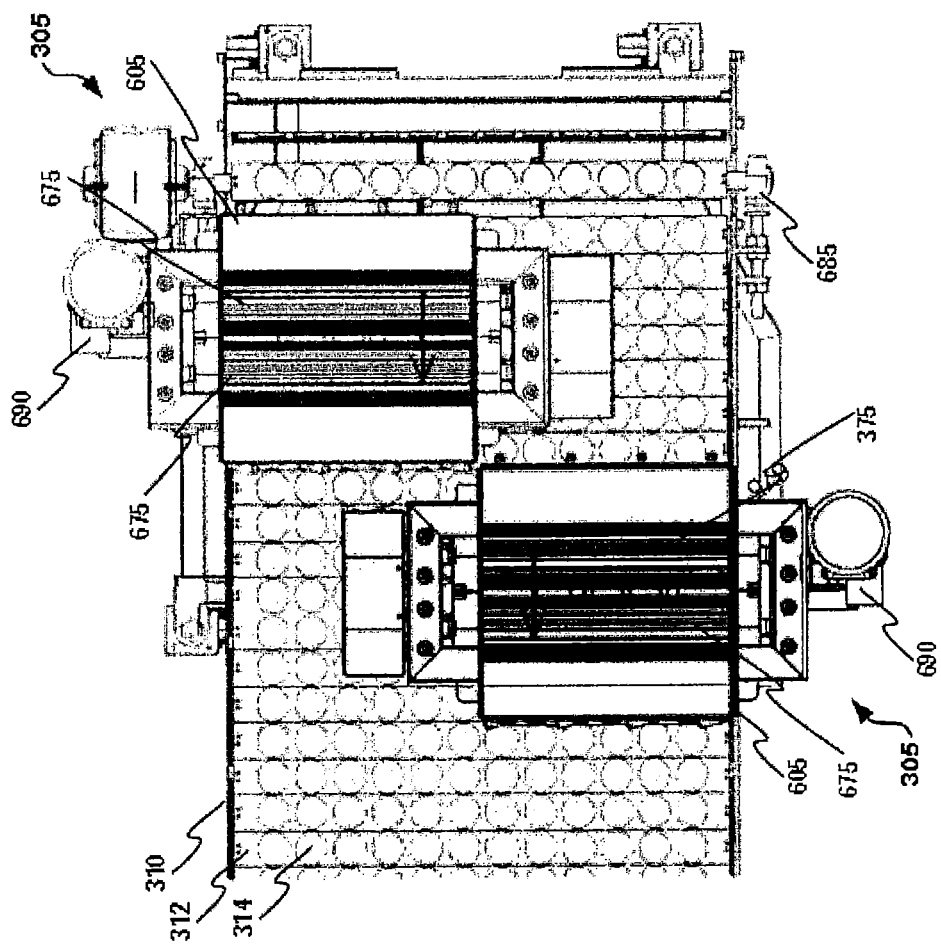
FIG. 7 is a top view of the two patty formers and the pan conveyor of FIGS. 3-6.

FIGS. 6 and 7 show more detailed side and top views, respectively, of patty formers 305 coupled to pan conveyor 310 of FIGS. 3-5. Patty formers 305 include two pan filler hoppers 605 that are attached to a frame portion of the pan conveyer 310 above individual form pans 312 (see FIG. 7). In the example of FIG. 7, each form pan 312, in this example, defines twelve individual patty molds 314 that the pan filler hoppers 605 fill with the heated ground meat (for the warm formation process) when individual form pans 312 pass under the pan filler hoppers 605. In an embodiment, form pans 312 may have a pitch of about 3 inches. Each form pan 312 may be mounted on a set of chains. In one example, the chains may be K1 chains, where K1 refers to the type of attachment holding the form pans 312 to the chain.

The patty molds 314 in the form pans 312 are shown in FIG. 7 as being round, but they may be oval or any other desired shape. Oval patty molds, for example, may have a long axis parallel to the direction of movement of pan conveyor 310. It has been found that fibers of the ground meat may be aligned by the patty former 605 and the flow block 680 and the fibers shrink more along the aligned direction. Therefore, oval patty molds may result in a more circular final product, which may be desirable. The same principle of controlling the final shape based on expected fiber shrinkage may also apply to rectangular patty molds, in the event that a square product is desired.

A pan conveyor drive motor 685 is coupled to pan conveyor 310 to drive the individual form pans 312 with the pan conveyor 310 through the first infrared oven 320-1. A pair of traction roller motors 690 cause the traction rollers 675 of respective pan filler hoppers 605 to rotate inwardly and urge the heated ground meat through respective flow blocks 680, at low pressure, to fill the patty molds 314 of the form pans 312. In other words, the finely ground heated meat mixture is funneled into patty molds 314 of patty form pans 312 using patty formers 305, including traction rollers 675, flow blocks 680 and traction roller motors 690. In an embodiment, the combination of the height of the meat in the pan filler hoppers 605 and the traction rollers 675 develops a pressure of about 3-4 feet of water head which equates to about 1.5 to 2 psi or so, depending on the size of the pan filler hopper 605 and the traction rollers 675. The low pressure provides a loose texture to the patties, which is desirable when pushing the ground meat into the patty molds 314.

It has been found that because of the slipperiness of the heated ground meat, smooth traction rollers 675 may not provide enough pressure to adequately force the ground meat through the flow block 680. The addition of grooves to the traction rollers 675 forces the heated ground meat into the narrow pathway of the flow block 680 more effectively. The grooves are generally parallel to the spin axis of the traction rollers 675 and may be, in an embodiment, about ⅛ of an inch wide and deep. The narrowest constriction in flow block 680, described below, may be about the same size as the gap between traction rollers 675.

Figure 8:
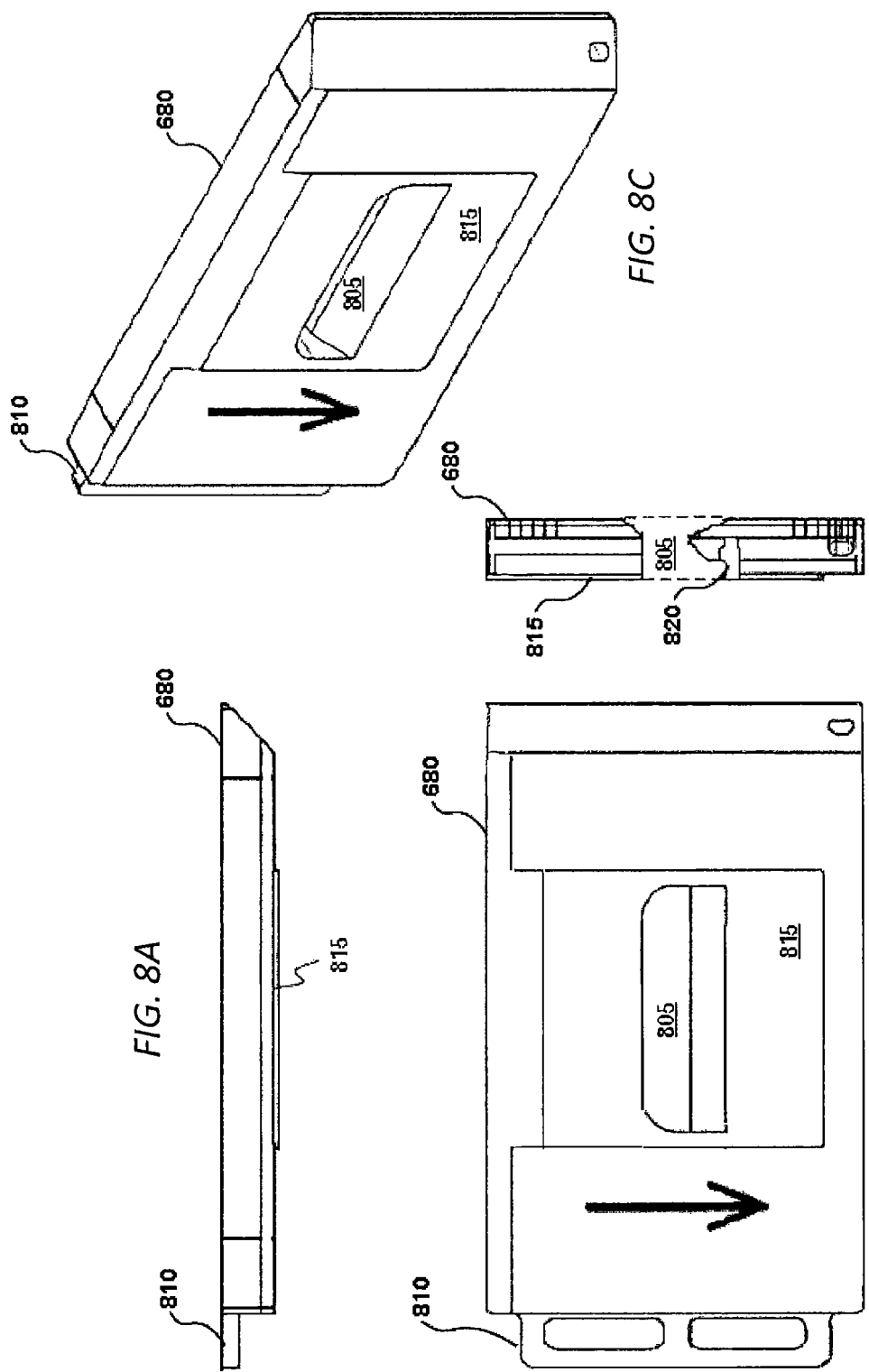
FIGS. 8A-8D are a set of illustrations of side, bottom, isometric and cross section cut views of a flow block used to funnel meat product into patty form pans with the patty formers of FIGS. 3-7.

FIGS. 8A-8D are a set of illustrations of side (FIG. 8A), bottom (FIG. 8B), isometric (FIG. 8C) and cross section cut (FIG. 8D) views of flow block 680 that may be used to funnel the heated ground meat product (for the warm formation process) into patty molds 314 of the patty form pans 312 with patty formers 305 of FIGS. 3-7. As seen in FIGS. 8B-8D, funnel area 805 is formed in the flow block 680 passing from a top portion of the flow block to a bottom portion of the flow block 680.

As seen in FIG. 8D, funnel area 805 initially constricts to a narrow choke area in the flow block and then expands to lower the pressure of the meat while the meat is forced into the patty molds 314 of the form pans 312 in a manner similar to a converging-diverging nozzle.

A handle 810 (seen in FIGS. 8A-8C) provides an operator with a convenient means for pushing flow blocks 680 into a bottom portion of pan filler hoppers 605. A faceplate 815 provides a seal against form pans 312 such that the ground meat stays within funnel area 805 while being urged into the patty molds 314. A spring-loaded scraper 820 (seen in FIG. 8D) with a concave profile is located downstream of traction rollers 675 and downstream of funnel 805. Scraper 820 presses firmly against a top surface (e.g., aluminum or other metal) of the form pans 312 to scrape away most of the heated ground meat product above patty molds 314 such that the patties have a flat upper surface. Specifically, as form pans 312 move under the flow block 680, a rear angle edge of a chamfer defined in funnel area 805 presses the ground meat into patty molds 314 (along with the pressure of pan filler hopper 605 and traction rollers 675), and scraper 820 scrapes the top of form pans 312, leaving the tops of form pans 312 clean and the patties flat.

Flow block 680 may be made of a plastic such as UHMW. However, it has been found that the intense heat of the infrared ovens 320 may heat form pans 312 to a point where an all-UHMW flow block may warp. If a surface of flow block 680 that touches form pans 312 includes a Teflon layer backed by an aluminum plate, which are then attached to a top layer of UHMW, flow block 680 is more resistant to warping. By making the top portion of flow block 680 out of UHMW plastic, flow block 680 and the bottom of pan filler hopper 605 may be sealed.

Spring loaded scraper 820 may be a Teflon bar that sits in a groove defined in the Teflon base layer of flow block 680.

The Teflon bar may have a set of aligning springs above it (not shown) pushing spring loaded scraper 820 against form pans 312.

Figure 9:
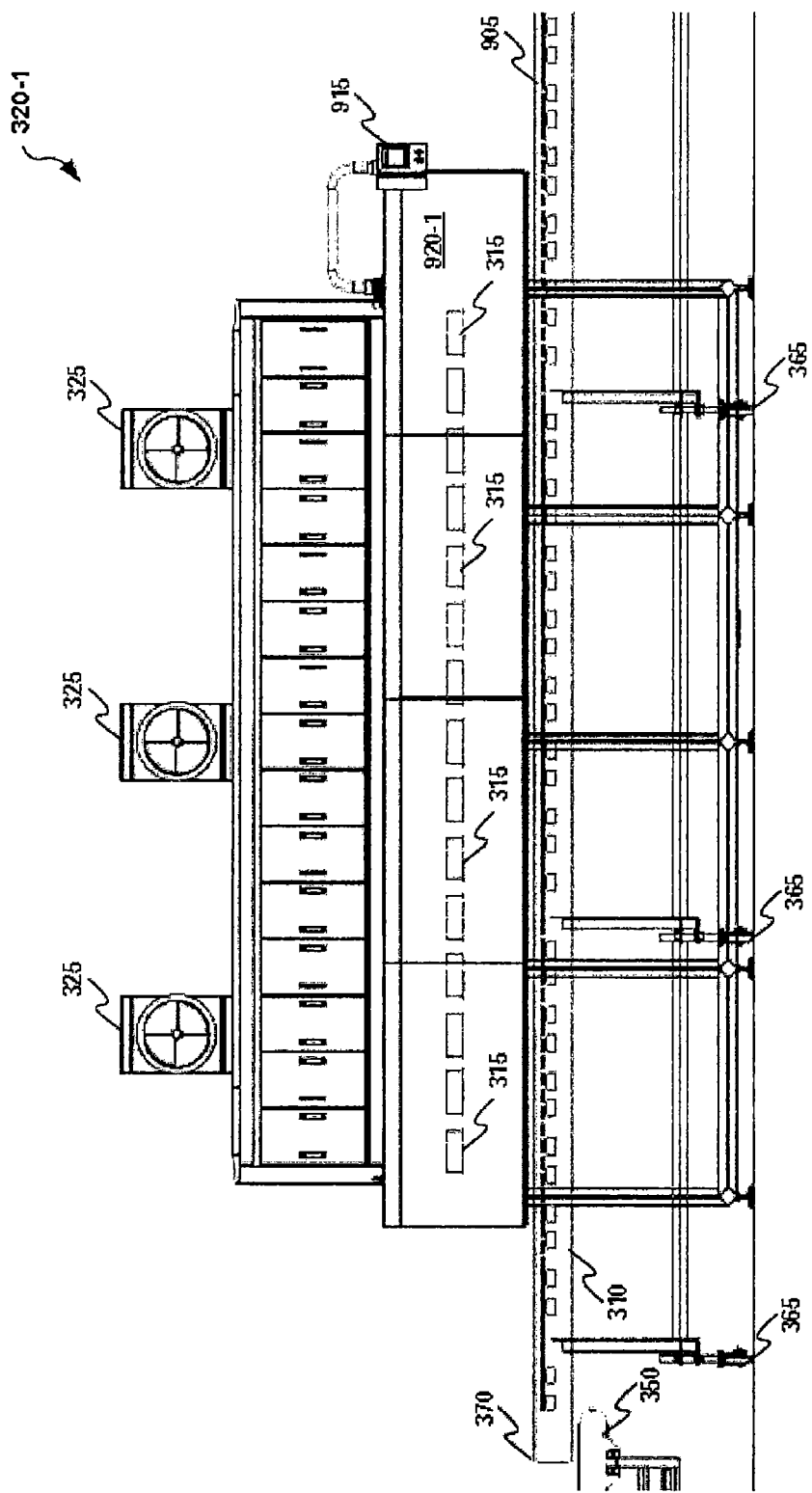
FIG. 9 is a side view of a first infrared oven used in the system of FIGS. 3 and 4.

FIG. 9 shows a more detailed side view of the first infrared oven 320-1 and a left portion of the pan conveyor 310 including the patty flipping portion 370 that flips the meat patties, after the top surfaces are precooked/seared by the first infrared oven 320-1, onto the patty conveyor 350. As shown in FIG. 9, a pan preheater 905 (e.g., a radiant heating system, or possibly a conduction system) under form pans 312 on pan conveyor 310, is configured to preheat form pans 312 after being filled with the heated ground meat. The preheating helps to ensure partial melting of the fat trimmings in patty molds 314 to help to flip the meat patties out of patty molds 314 at patty flipping portion 370.

A control panel 915 is used to set temperatures of the first, second and third infrared ovens 320-1, 320-2 and 320-3, and conveyance speed parameters of pan conveyor 310 and patty conveyor 350. In an embodiment, a first infrared oven compartment 920-1 is cantilevered over pan conveyor 310 and houses infrared burners 315, which can be moved up and down relative to pan conveyor 310 using the control panel 915.

FIG. 10 is a top view of the patty flipping portion 370 between pan conveyor 310 and patty conveyor 350 of the system of FIGS. 3 and 4. As shown in FIG. 10, when pan conveyor 310 exits the first infrared oven 320-1, pan conveyor 310 reaches a reversal point at patty flipping portion 370. When pan conveyor 310 revolves around the reversal point at patty flipping portion 370, the patties are caused to fall out of patty molds 314 in the form pans 312 and caused to flip over onto patty conveyor 350. After flipping onto pan conveyor 350, the patties are conveyed on patty conveyor 350 into oven compartment 920-2 of the second infrared oven 320-2. The relative height between the pan conveyor 310 and the patty conveyor 350 is sized to ensure that the patties are rotated during flipping in such a way that all the patties, or substantially all the patties, land with the top side on patty conveyor 350 and with the side that was touching form pans 312 facing upwards.

Figure 11:
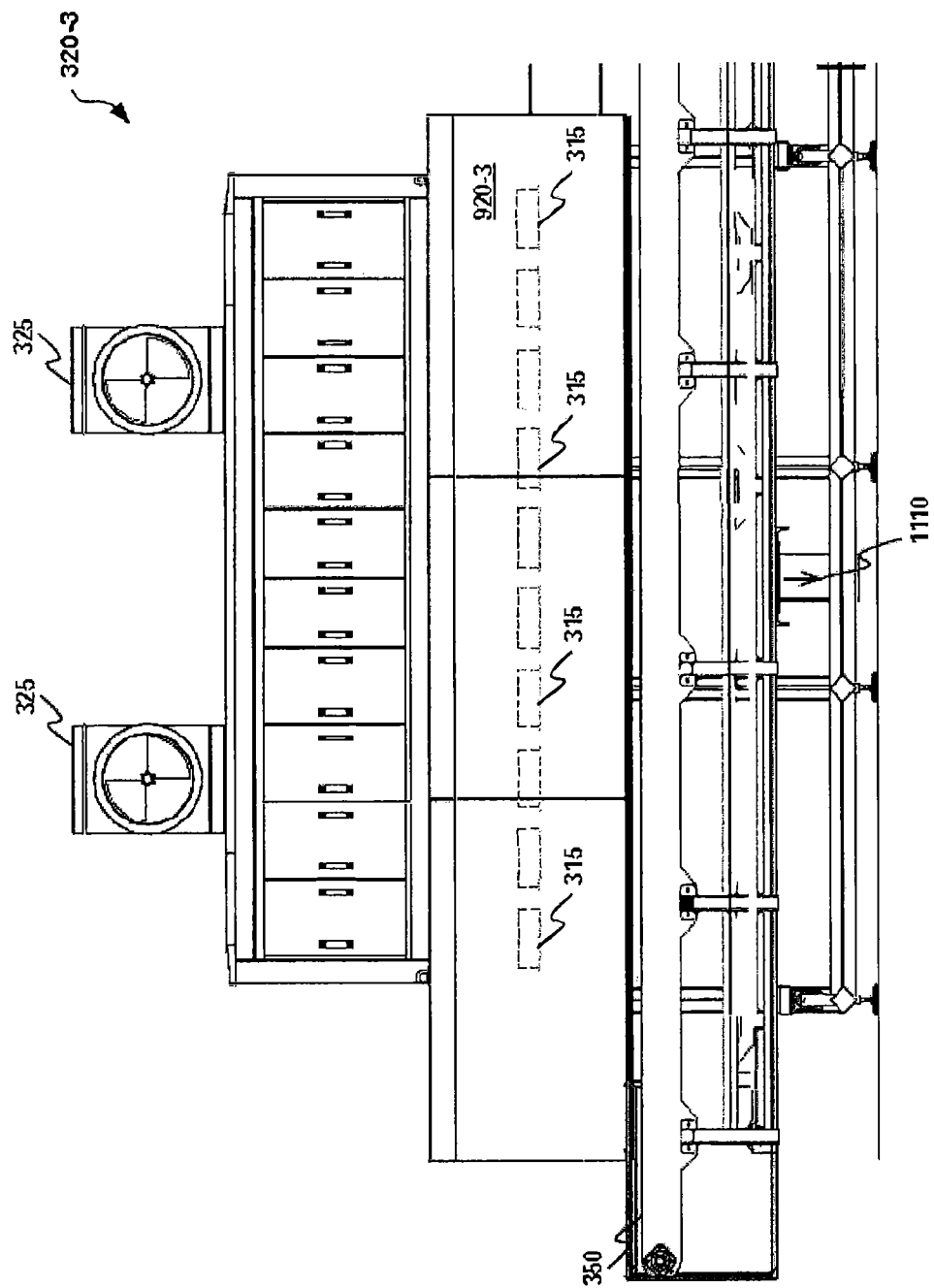
FIG. 11 is a side view of a third infrared oven of the system of FIGS. 3 and 4.
Figure 12:
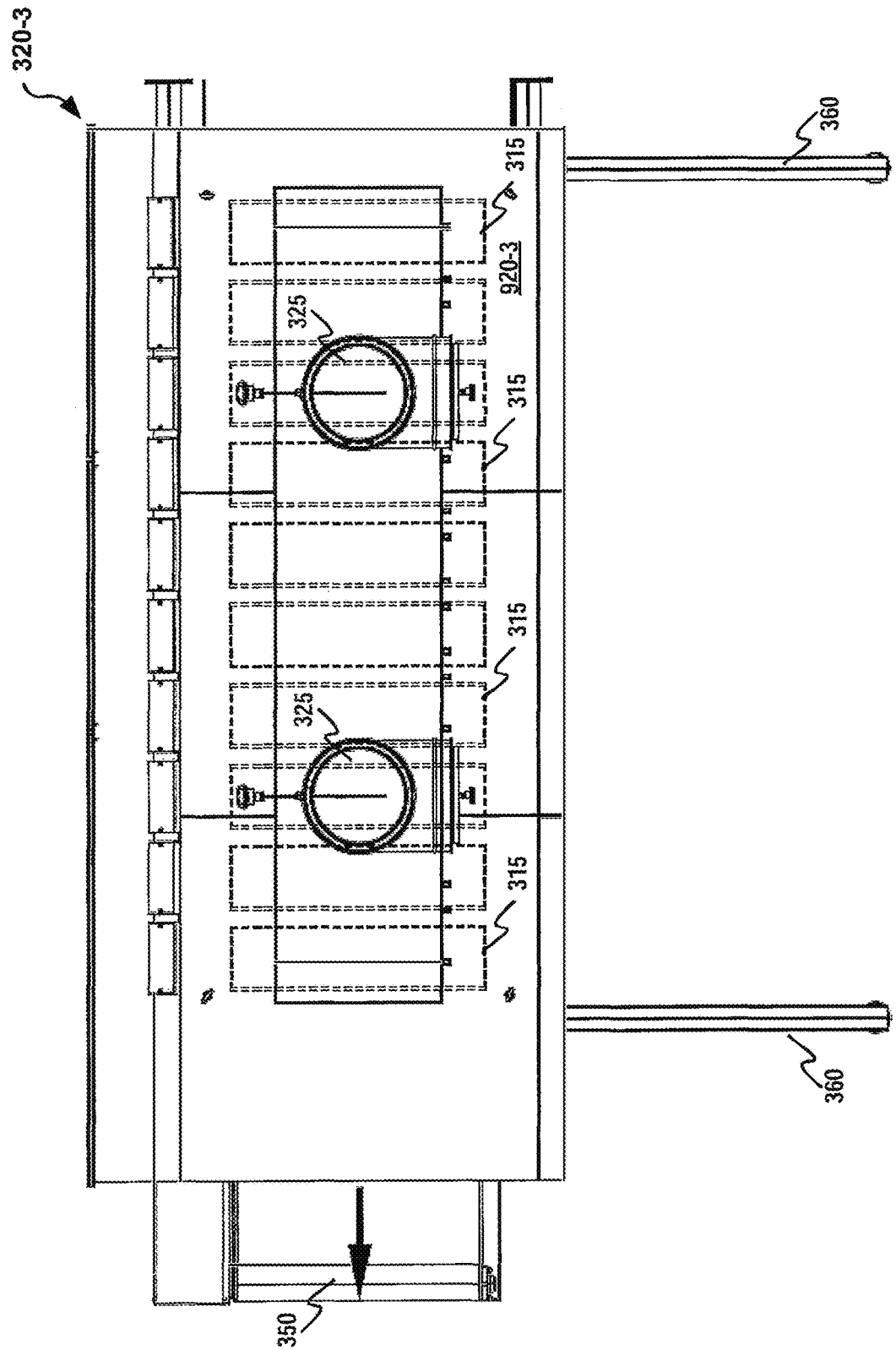
FIG. 12 is a top view of the third infrared oven of FIG. 11.

FIGS. 11 and 12 show a side view and a top view, respectively, of the third infrared oven 320-3 shown in FIGS. 3 and 4. The third infrared oven 320-3 and the second infrared oven 320-2 are similar, in this example. The side view in FIG. 11 shows infrared burners 315 in oven compartment 920-3, where infrared burners 315 are also movable in a vertical direction to be a selected distance from the patties being conveyed below on patty conveyor 350. As also illustrated in FIG. 11, the third infrared oven 320-3 (and the second infrared oven 320-2) is equipped with a grease drain 1110 where grease that is expelled from the patties and drips through grates of patty conveyor 350 drains into a collection area to be disposed of. As described above, when the patties reach the end of patty conveyor 350, they are conveyed (e.g., via another conveyor or other conveyance means not shown in FIGS. 11 and 12) to an impingement oven (not shown) for final cooking.

Figure 13:
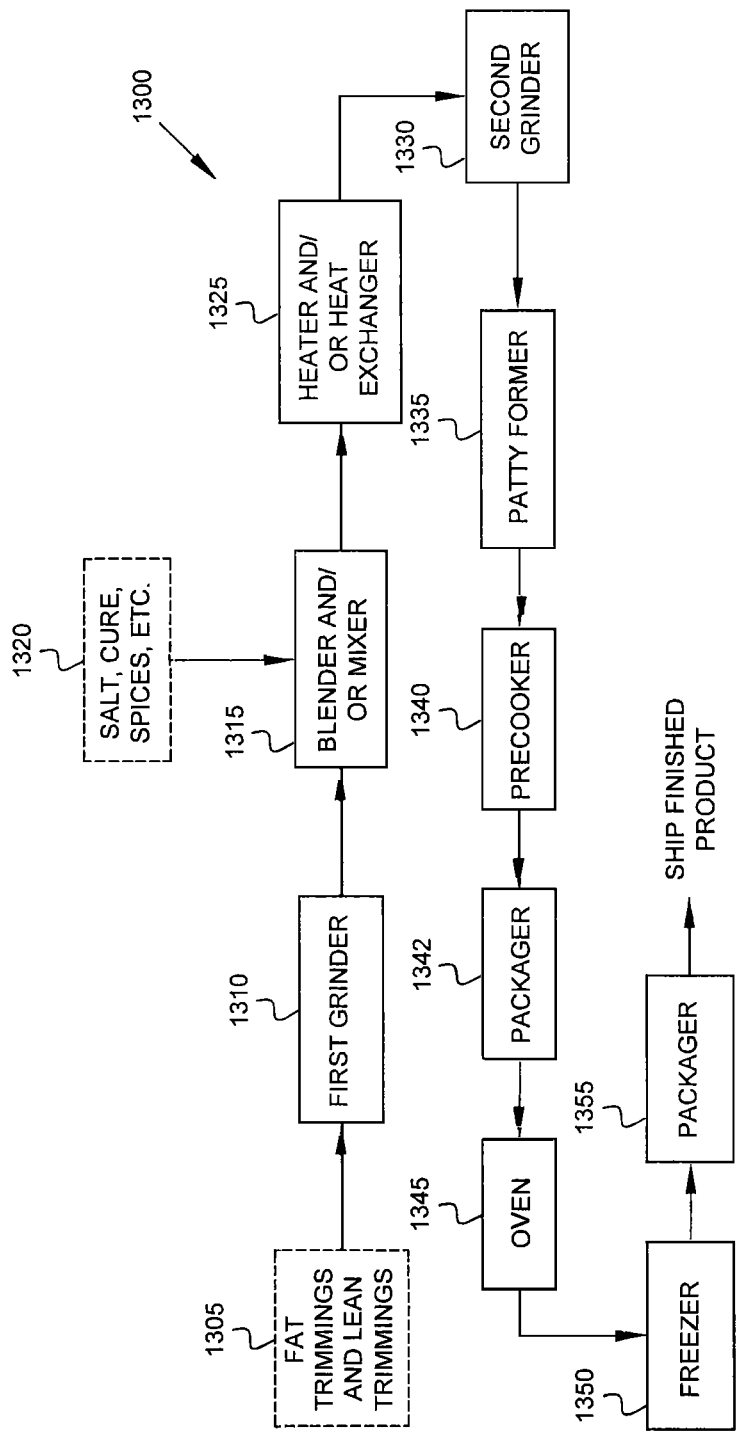
FIG. 13 is a block diagram for a system in accordance with another embodiment involving in-bag cooking of meat.

FIG. 13 is a block diagram for a system in accordance with another embodiment involving in-bag cooking of meat. A packager 1342 packages or bags each meat patty after it has been precooked by precooker 1340. For example, the meat patties may be individually wrapped in plastic bags. Then, the meat patties are cooked while inside bags at oven 1345. In-bag cooking of meat reduces the likelihood of certain types of meat contamination, e.g., because bacteria such as listeria can be killed by heat in oven 1345 and no bacteria or other undesirable organisms can enter the bags surrounding the patties. Other aspects of FIG. 13 are similar to aspects of FIG. 2 and do not require further explanation.

Figure 14A:
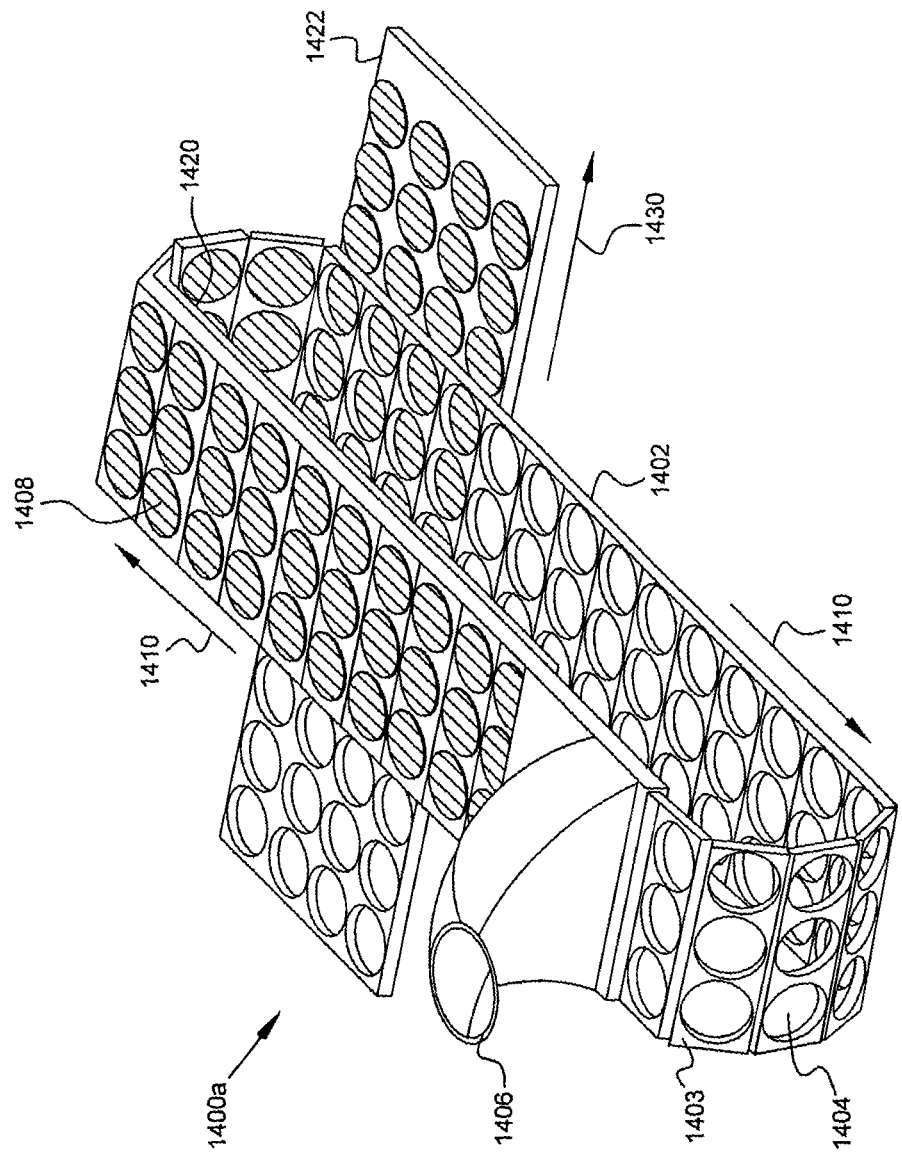
Figure 14B:
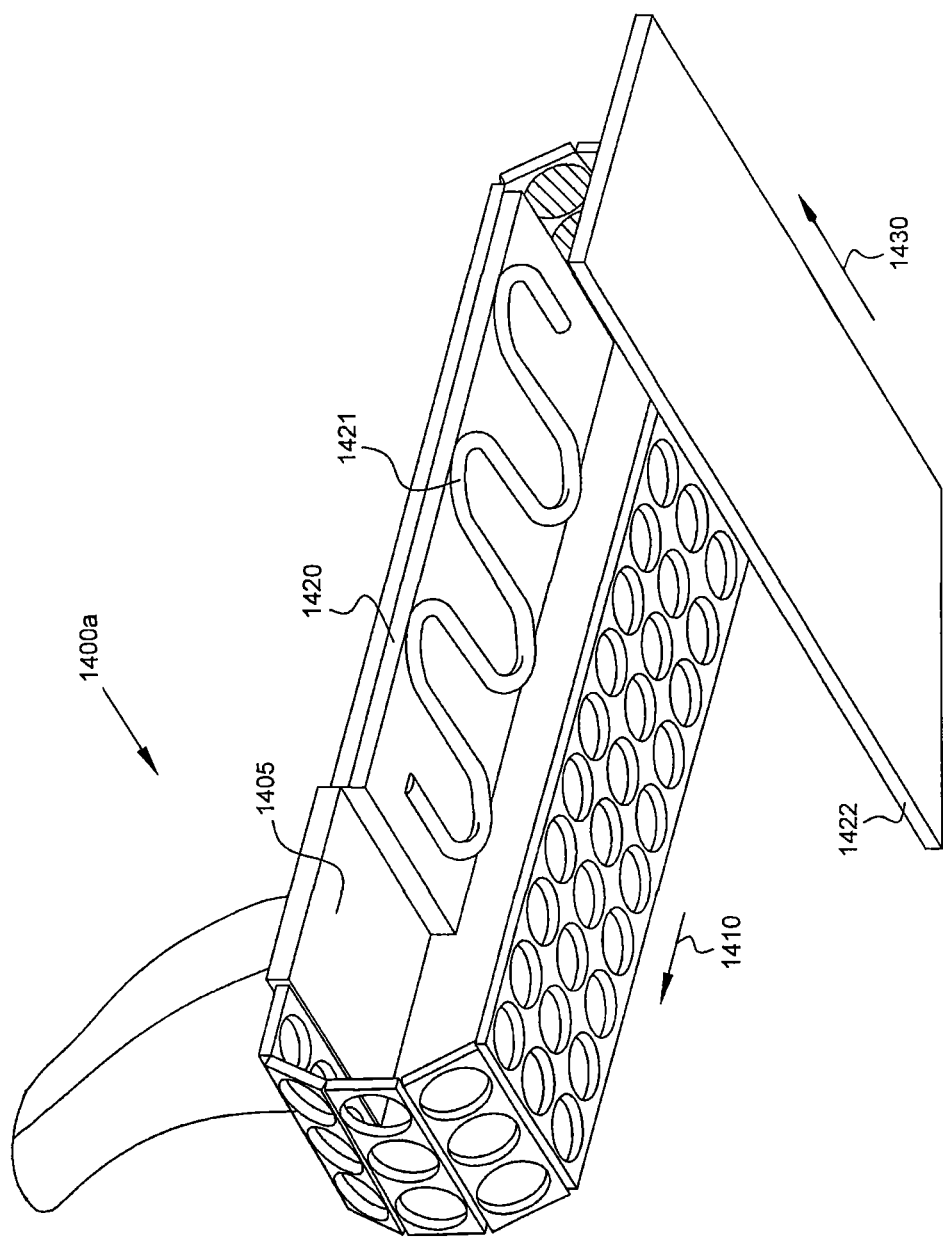

FIGS. 14A-14C are illustrations of another technique for forming and precooking meat patties. Referring to the top perspective view of FIG. 14A, an apparatus 1400a includes a conveyor 1402 that moves in the direction indicated by arrows 1410. Conveyor 1402 includes multiple form pans 1403, with each form pan defining one or more (in this example, three) individual patty molds 1404. Form pans 1403 may be implemented in a manner similar to form pans 312 shown in FIG. 7. Meat product (e.g., heated finely ground meat from second grinder 230 for the warm formation process) is fed into apparatus 1400a at inlet 1406, which directs the meat into respective form patty molds 1404. As seen in the bottom view of FIG. 14B, there is a bottom 1405 underlying patty molds 1404 along at least a portion of the length of the top portion of conveyor 1402, but the patty molds in this embodiment do not have a bottom at other locations along the conveyor, as evidenced by the ability to see through the patty molds at certain places in FIGS. 14A-14B. As each patty 1408 proceeds along conveyor 1402, it is heated by a heating plate 1420 and heating coil 1421, which may be an inductive heating coil.

Although heating plate 1420 and heating coil 1421 are shown in FIGS. 14A-14B in a configuration below the patties proceeding along the top part of conveyor 1402, in some embodiments the heating plate and heating coil may be positioned above the patties proceeding along the top part of conveyor 1402, below the patties proceeding along the bottom part of conveyor 1402, or above the patties proceeding along the bottom part of conveyor 1402. In other words, heating may be performed on either side of either of the linear segments of conveyor 1402.

Another conveyor 1422, oriented, in the embodiment shown, substantially perpendicular to conveyor 1402 and with molds arranged and dimensioned to match patty molds 1404, moves in the direction indicated by arrow 1430 and transports the patties (heated by heating plate 1420 and heating coil 1421) for further processing. In some embodiments, a mechanical knockout unit (not shown) punches the patties out of molds 1404 to ensure that they are released at the correct time, e.g., in order to fall into molds of conveyor 1422.

FIG. 14C is a perspective view of another apparatus 1400b that is similar to apparatus 1400b but includes a first heating plate 1420a and first heating coil 1421a above form pans 1403, and a second heating plate 1420b and second heating coil (not shown in this view) below form pans 1403. By including two heating elements on either side of the patties moving along conveyor 1402 (a configuration referred to as top and bottom heat jackets or dual heat jackets), the patties are quickly and efficiently heated in a uniform manner. Although the dual heat jackets are shown in FIG. 14C as sandwiching the top linear segment of conveyor 1402, in some embodiments they may sandwich the bottom linear segment of conveyor 1402.

Figure 15A:
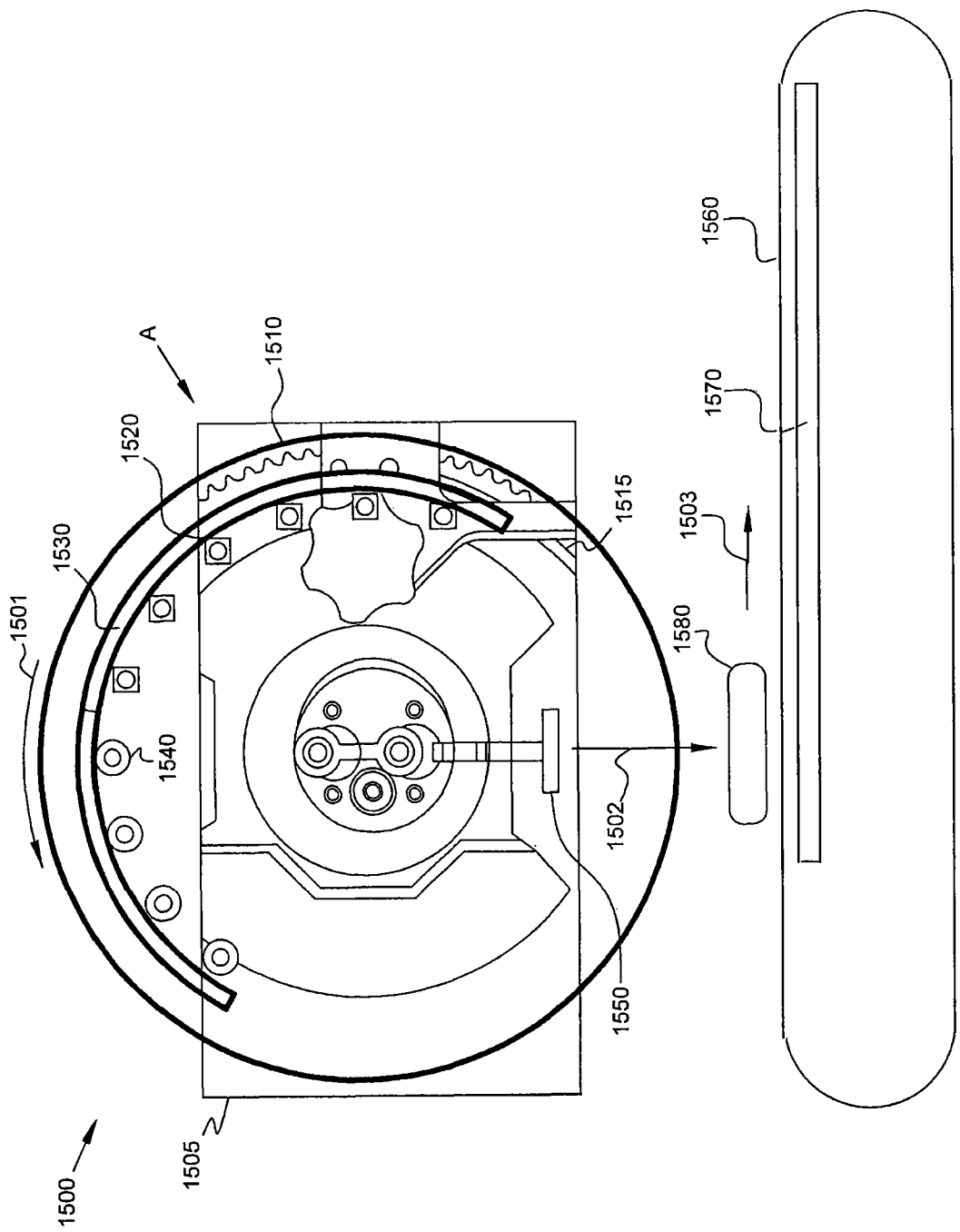
FIGS. 15A-15B are elevation and top views, respectively, of a system for patty formation and precooking in accordance with some embodiments.
Figure 15B:
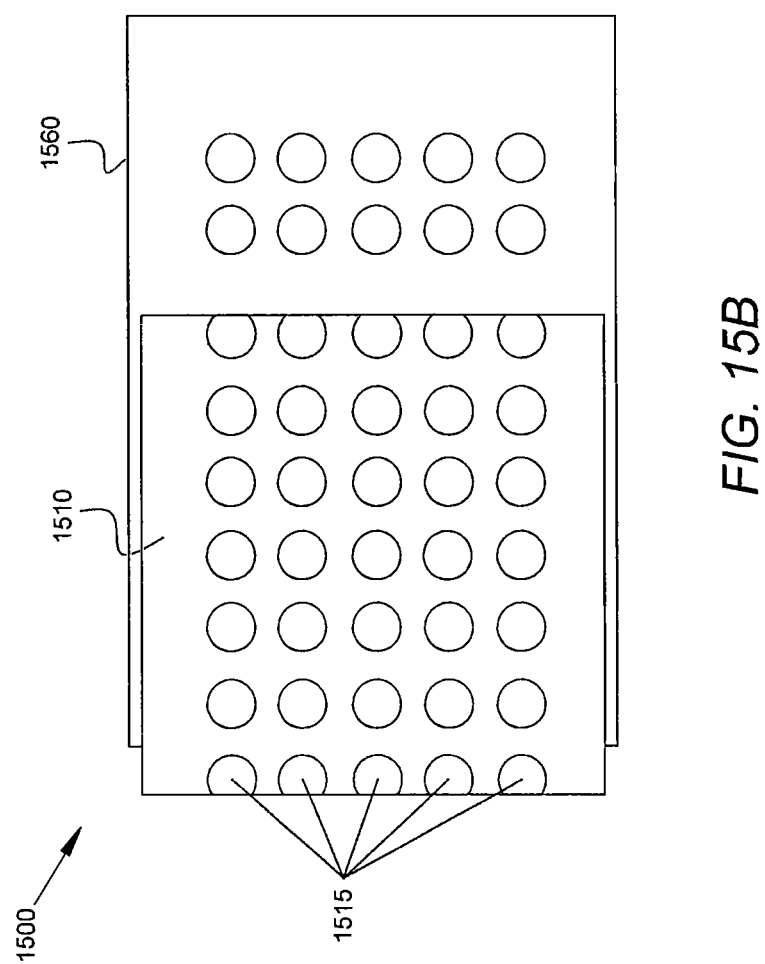

FIG. 15A is an elevation view of a system 1500 in accordance with some embodiments of the present disclosure. FIG. 15B is a top view of system 1500. System 1500 includes a rotary forming apparatus 1505 for forming meat patties. Rotary forming apparatus 1505 includes a drum 1510 that rotates in direction 1501 (shown as a counter-clockwise direction in the example view of FIG. 15A, but a configuration having a clockwise rotation is also contemplated). A plurality of patty form molds 1515, each of which may be round, oval, or having any other desired shape, are positioned to receive meat product that may be provided to rotary forming apparatus 1505 from a hopper via an inlet (not shown). In an embodiment, patty form molds 1515 comprise sides with a bottom, where the top is open. In another embodiment, patty form molds 1515 comprise sides where both the top and bottom are open.

In an embodiment, patty form molds 1515 are filled with meat product from the hopper when the patty form molds are at position A as shown in FIG. 15A. Other positions for filling the patty form molds with meat product are contemplated herein taking into account the criteria that the meat product has a sufficient amount of time to form a skin, as discussed below, in less than one full rotation of the patty form molds around drum 1510. The meat product may correspond to any meat species and may comprise, e.g., chicken, beef, turkey, pork, and combinations thereof.

The meat product that fills patty form molds 1515 is initially of a consistency that does not hold together sufficiently well for handling and/or process purposes. As patty form molds 1515 are transported along a circular path by rotation of drum 1510, the meat product within patty form molds 1515 is heated by one or more induction coils 1520 embedded on the inside of drum 1510. In other embodiments, induction coils 1520 may be disposed on the outside of drum 1510 and/or on both the inside and outside of drum 1510. Rotary forming apparatus 1505 may also include one or more insulator plates 1530 for providing insulation, as well as one or more cooling coils 1540 for providing cooling capability, e.g., to control the temperature and thus the heating of the meat product in patty form molds 1515. The placement of the induction coils 1520 and the cooling coils 1540 in FIG. 15A is exemplary only. Other arrangements of the induction coils 1520 and the cooling coils 1540 are contemplated herein. Because drum 1510 becomes hot, it is desirable to prevent excessive heat conduction to the working mechanism of rotary forming apparatus 1505, because the thermal expansion could cause excessive stress and wear. Cooling coils 1540 and insulator plate(s) 1530 are designed to keep the temperatures of the working mechanism within their normal operational limits.

Thus, the meat product is heated as drum 1510 rotates, and a skin is set on the outside surface of each meat patty. The skin may comprise denatured proteins from the meat product and the skin on the meat patty may have a depth D. In some embodiments, the depth D is a small fraction of the thickness H of the meat patty. In certain embodiments $0 \leq D \leq 0.1H$. In other embodiments, $0.01H \leq D \leq 0.05H$. In still other embodiments, $0.1H \leq D \leq 0.25H$. In further embodiments, $0.01H \leq D \leq 0.33H$. In still further embodiments, $0 \leq D \leq 0.49H$. In all embodiments, portions of the meat product in the meat patty that is located under the skin is not fully cooked by the heating of the meat product to form the skin.

The configuration of rotary forming apparatus 1505 makes efficient use of available space and provides heating via induction coil(s) 1520 that forms the skin completely around the meat patty. The resulting skin makes patty 1580 hold together sufficiently well for further handling and/or process purposes. A knockout unit 1550, visible as a rectangular device in the side view of FIG. 15A, moves in and out with respect to the central portion of the rotary forming apparatus 1505, e.g., in the manner of a piston, and knocks meat patties in patty form molds 1515 onto conveyor belt 1560 in direction 1502. For embodiments where patty form molds 1515 comprise sides with a bottom, knockout unit 1550 strikes the bottom of patty form molds 1515 with sufficient force to dislodge the meat patty from the patty form molds onto conveyor belt 1560. For embodiments where patty form molds 1515 comprise sides where both the top and bottom are open, knockout unit 1550 directly contacts the meat patty, thereby impelling the meat patty out of patty form mold 1515 onto conveyor belt 1560.

Conveyor belt 1560 may be a solid stainless steel belt in some embodiments. A meat patty 1580 that has landed on conveyor belt 1560 is transported in direction 1503. An induction coil 1570 positioned under belt 1560 provides additional heating in some embodiments. Additional processing may be performed, e.g., by moving patty 1580 onto another conveyor belt or to another apparatus in the meat processing system.

FIG. 15B is a top view of system 1500. In this example, patty molds 1515 are arranged in groups of five on drum 1510, but the patty molds may be arranged in other configurations.

Figure 16:
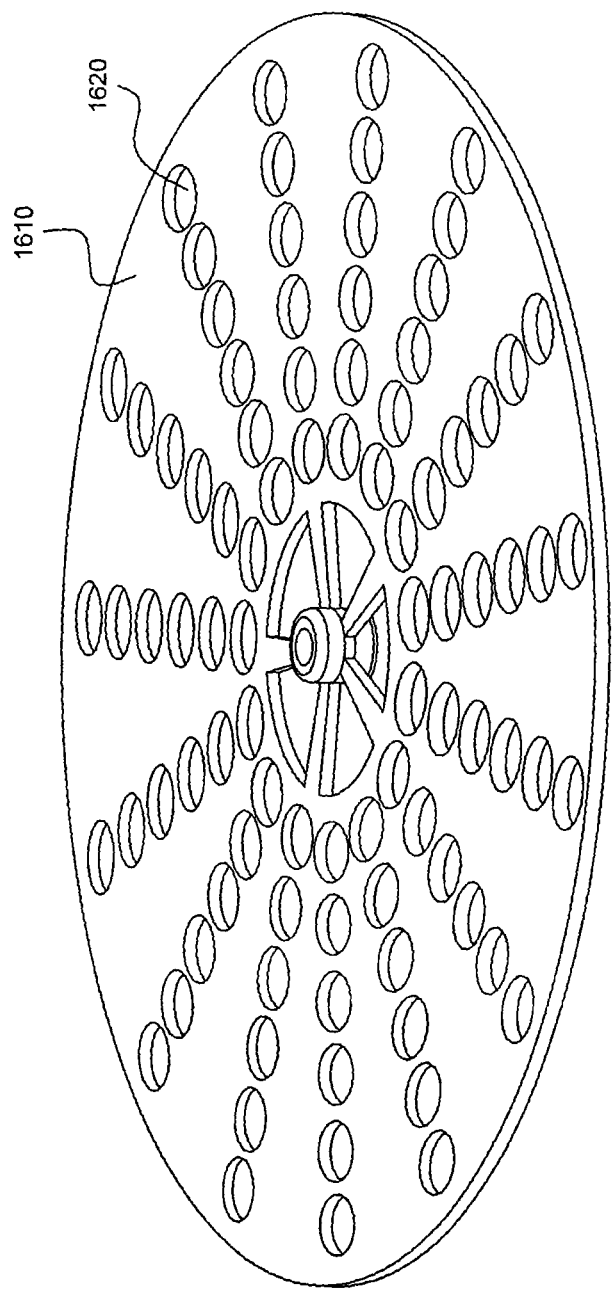
FIG. 16 is an illustration of a patty form disk in accordance with some embodiments.

FIG. 16 is an illustration of patty form disk 1610 in accordance with some embodiments. Patty form disk 1610 defines multiple patty form molds 1620 arranged in a starburst pattern, emanating radially outward from a central region of patty form disk 1610.

Figure 17A:
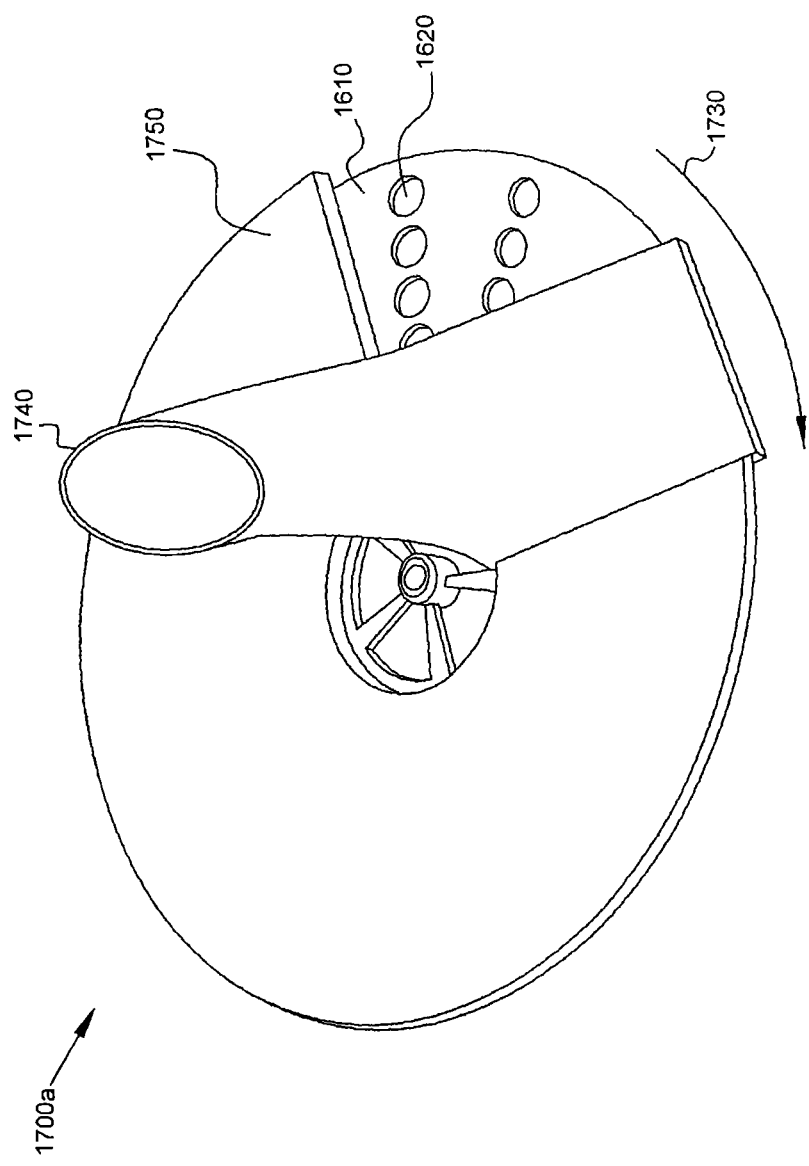
FIGS. 17A-17B are illustrations of patty forming apparatuses in accordance with some embodiments.

FIG. 17A is an illustration of a patty forming apparatus 1700a in accordance with some embodiments. Patty forming apparatus 1700a includes patty form disk 1610 which defines patty form molds 1620. Meat product (e.g., heated ground meat, for the warm formation process) inserted at inlet 1740 is funneled into patty form molds 1620. Patty form disk 1610 rotates in rotational direction 1730, and for a portion of the rotation heating is provided via induction heater 1750. In this example, induction heater 1750 covers approximately three-fourths of the angular extent of patty form disk 1610, and that angular extent defines an induction cooking zone. In other examples, induction heater 1750 may cover a different proportion of patty form disk 1610. In some embodiments, a bottom is provided underneath form molds 1620 at the region corresponding to induction heater 1750. When patties proceeding along the rotational motion of patty form disk 1610 exit the induction cooking zone, they may be released from patty form disk 1610, e.g., if there is no bottom underlying the patties there.

Although heater 1750 is shown positioned above patty form disk 1610 in FIG. 17A, in various embodiments the heater may be below the patty form disk, or two heaters may be provided above and below the patty form disk, respectively. Although patty form disk 1610 rotates and heater 1750 remains fixed in the above example, in other examples the patty form disk remains fixed and the heater rotates, or both the patty form disk and the heater are rotatable. By controlling the duration of exposure of patties in form molds 1620 to heating, the temperature of the patties and the degree of cooking can be controlled.

Figure 17B:
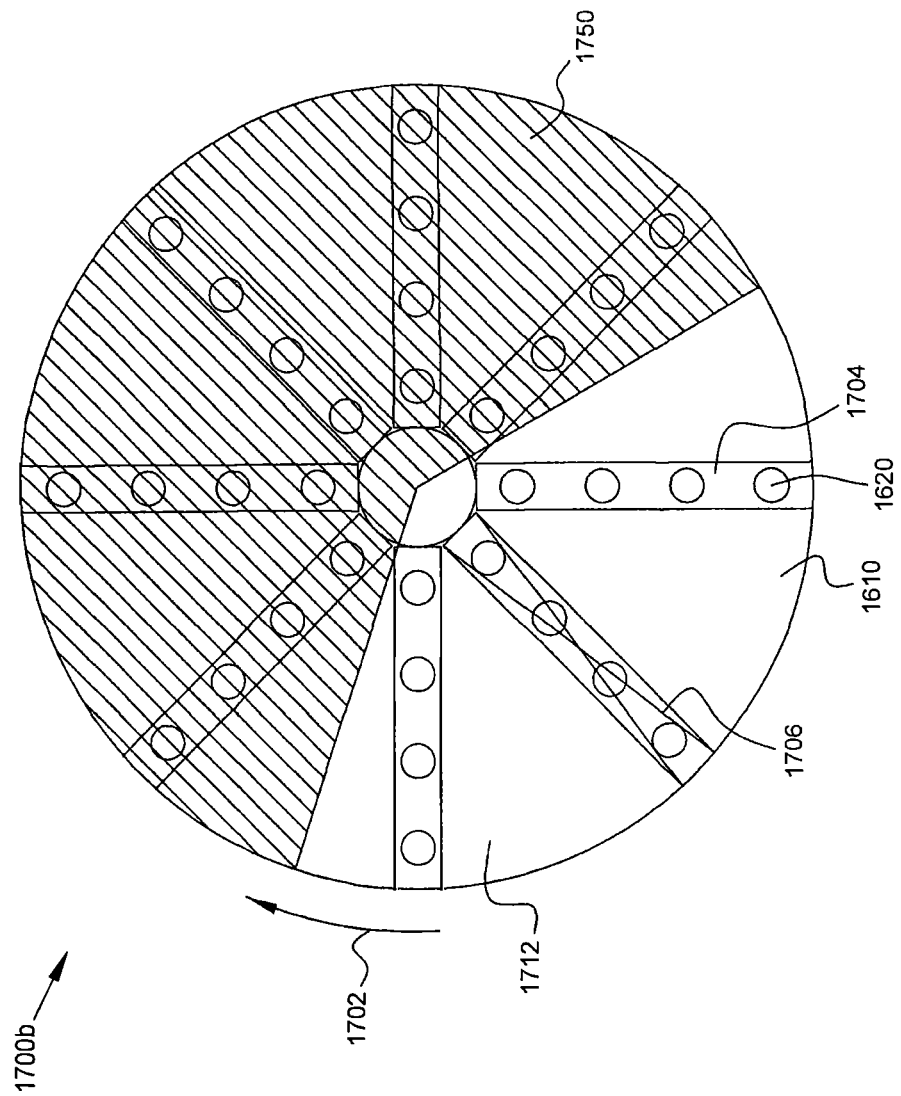

FIG. 17B is a top view of a patty forming apparatus 1700b in accordance with some embodiments. Patty forming apparatus 1700b is similar in several respects to forming apparatus 1700a but varies in some of the geometrical details regarding patty form molds 1620 and induction heater 1750. Patty form molds 1620 are filled with meat product via nozzle 1706, which may be positioned at a given angular position relative to heater 1750. Induction plate insert 1704 may be formed of a highly inductive material, and other portions of patty form disk 1610 (e.g., at location 1712) may be formed of a non-inductive material. Patty form disk 1610 rotates in rotational direction 1702, causing meat patties to be precooked/seared by heater 1750. When patties proceeding along the rotational motion of patty form disk 1610 exit the induction cooking zone corresponding to heater 1750, they may be released from patty form disk 1610, e.g., if there is no bottom underlying the patties there.

Figure 18B:
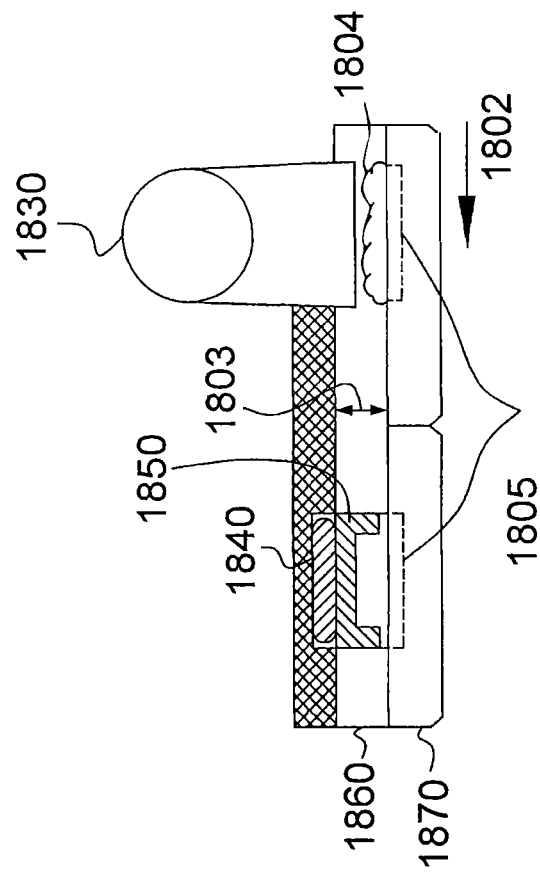
FIGS. 18A-18B are illustrations of an apparatus that provides uniform flatness to formed meat patties in accordance with some embodiments. 18A: top view; 18B: partial sectional view.
Figure 18A:
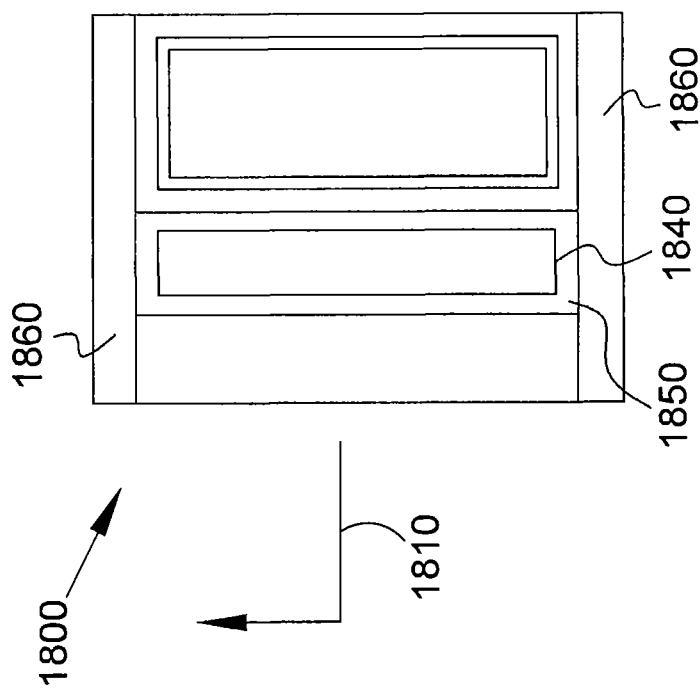

FIG. 18A is a top view of an apparatus 1800 that provides uniform flatness to formed meat patties in accordance with some embodiments. Apparatus 1800 is better understood with reference to the partial sectional view (FIG. 18B) taken at the orientation indicated by 1810. Referring to the partial sectional view of FIG. 18B, meat product (e.g., heated finely ground meat, for the warm formation process) may be mixed with various ingredients and dispensed from nozzle 1830 into patty form molds 1805 defined by mold plates 1870 (e.g., made of stainless steel or other metal) which moves as indicated by arrow 1802 in this example. Some of the meat product may mound above the form mold 1805 as shown by 1804. Plate 1860 (e.g., a high temperature resistant teflon plate) is stationary. As the mold plates 1870 move, an air bladder 1840 inflates, causing a scraper 1850 to push downward (indicated by arrow 1803) on the top surface of the meat patty thereby removing the mound 1804 and flattening the top surface of the meat patty. Then air bladder 1840 deflates (indicated by arrow 1803) causing scraper 1850 to retract (e.g., by a spring (not shown)), and the process continues for successive passing patties. The shape of the scraper 1850 may be of any useful shape to perform the necessary scraping action.

Figure 19:
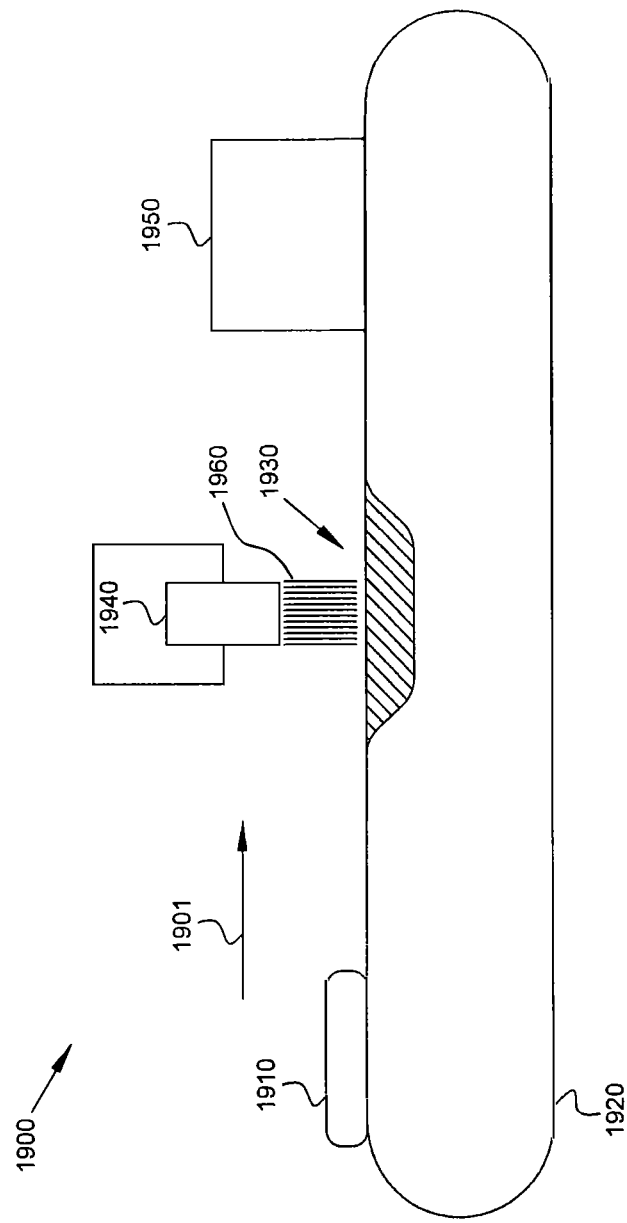
FIG. 19 is a side view of a system for precooking meat patties using a hot water treatment.

In some embodiments, a meat product is processed with a hot water bath to improve the consistency of the meat product and facilitate handling of the meat product by creating a skin of denatured protein as discussed above. In some embodiments, the meat product is in the form of a nugget which may comprise chicken. In other embodiments, the meat product is a patty, as described above. FIG. 19 is a side view of a system 1900 for precooking/searing meat products using such a hot water bath. Referring to FIG. 19, a meat product block (e.g., a nugget or patty) 1910, which may be ¼" ground patty, is warm formed in the range of about 45-50° F. In some embodiments, meat block 1910 comprises finely ground chicken, which is among the most difficult meat products to handle, as it tends to come apart when one tries to hold or manipulate it. The interior of meat block 1910 may have an interior that is raw and at a temperature of about 40° F. Meat block 1910 is transported along conveyor belt 1920 in a direction corresponding to arrow 1901 (left to right in the side view of FIG. 19) and is processed by hot water bath 1930 in some embodiments. For example, a pipe or faucet 1940 connected to a hot water source may supply hot water to the hot water bath.

The hot water bath may include water at a temperature between 140-212° F., e.g., about 190° F. Meat block 1910 may be treated with (e.g., immersed in) hot water bath 1930 for a few seconds. The duration of exposure to hot water bath 1930 may be dependent on the temperature of the water, e.g., with a longer exposure as the temperature approaches 140° F. and a shorter exposure as the temperature approaches 212° F.

In some embodiments, a sprayer or mister is used to apply water (or other liquid, such as an edible oil), e.g., in liquid or mist form 1960 (with or without bath 1930), to meat block 1910, e.g., from above as meat block 1910 proceeds along conveyor 1920 belt in direction 1901. A sprayer or mister may also be positioned below meat block 1910 (not shown) to apply an upward jet or mist to the bottom of meat block 1910. In some embodiments using a hot water bath 1930, meat block 1910 is immersed in the hot water bath such that all portions of the meat block 1910 are exposed to the hot water.

As a result of the hot water treatment, a skin is set on the outside surface of meat block 1910 such that meat block 1910 does not come apart when grasped or handled. The skin may be uniformly present at the surface of meat block 1910. The skin may comprise denatured proteins from the meat product and the skin on the meat block may have a depth D. In some embodiments, the depth D is a small fraction of the thickness H of the meat block. In certain embodiments $0 \leq D \leq 0.1H$. In other embodiments, $0.01H \leq D \leq 0.05H$. In still other embodiments, $0.1H \leq D \leq 0.25H$. In further embodiments, $0.01H \leq D \leq 0.33H$. In still further embodiments, $0 \leq D \leq 0.49H$. In all embodiments, portions of the meat product in the meat block 1910 that is located under the skin is not fully cooked by the heating of the meat product to form the skin.

In certain embodiments, meat block 1910 may then be processed at breading/battering station 1950, where bread particles or batter is applied to the meat block, e.g., with a dispenser that is timed to apply (e.g., blow) bread or batter as meat block 1910 passes through, under, or near breading/battering station 1950.

Meat block 1910 may be subjected to additional processing, e.g., cooking, freezing, and packaging. The task of moving meat block 1910 onto another conveyor belt for additional processing is greatly simplified because of the skin that holds meat block 1910 together in accordance with various embodiments.

Figure 20:
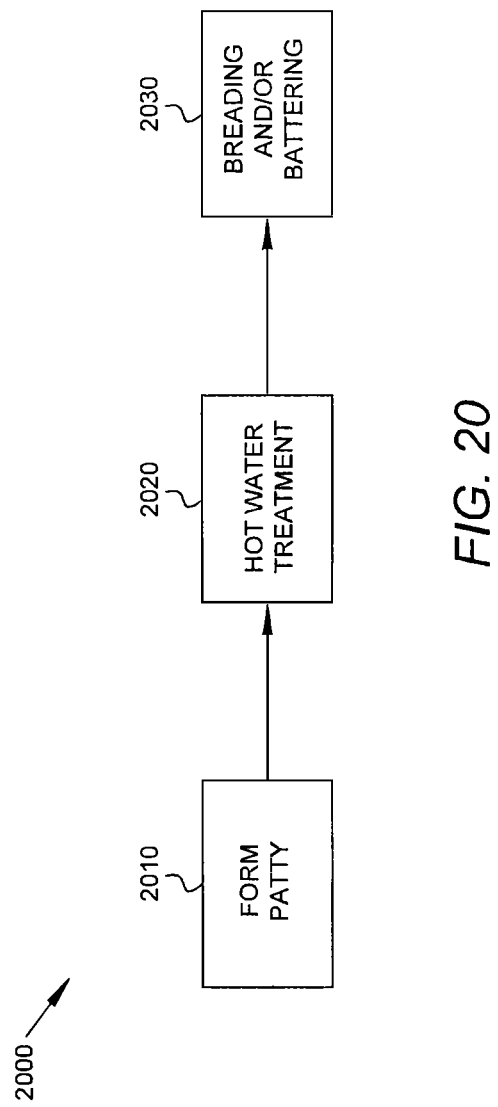
FIG. 20 a flow diagram of a process in accordance with some embodiments that includes hot water treatment of meat patties.

FIG. 20 is a flow diagram of a process 2000 in accordance with some embodiments. A patty (e.g., meat block 1910 shown in FIG. 19) is warm formed at block 2010. The patty is subjected to a hot water treatment at block 2020. The patty is breaded and/or battered at block 2030. Additional processing may be performed as well.

Figure 21:
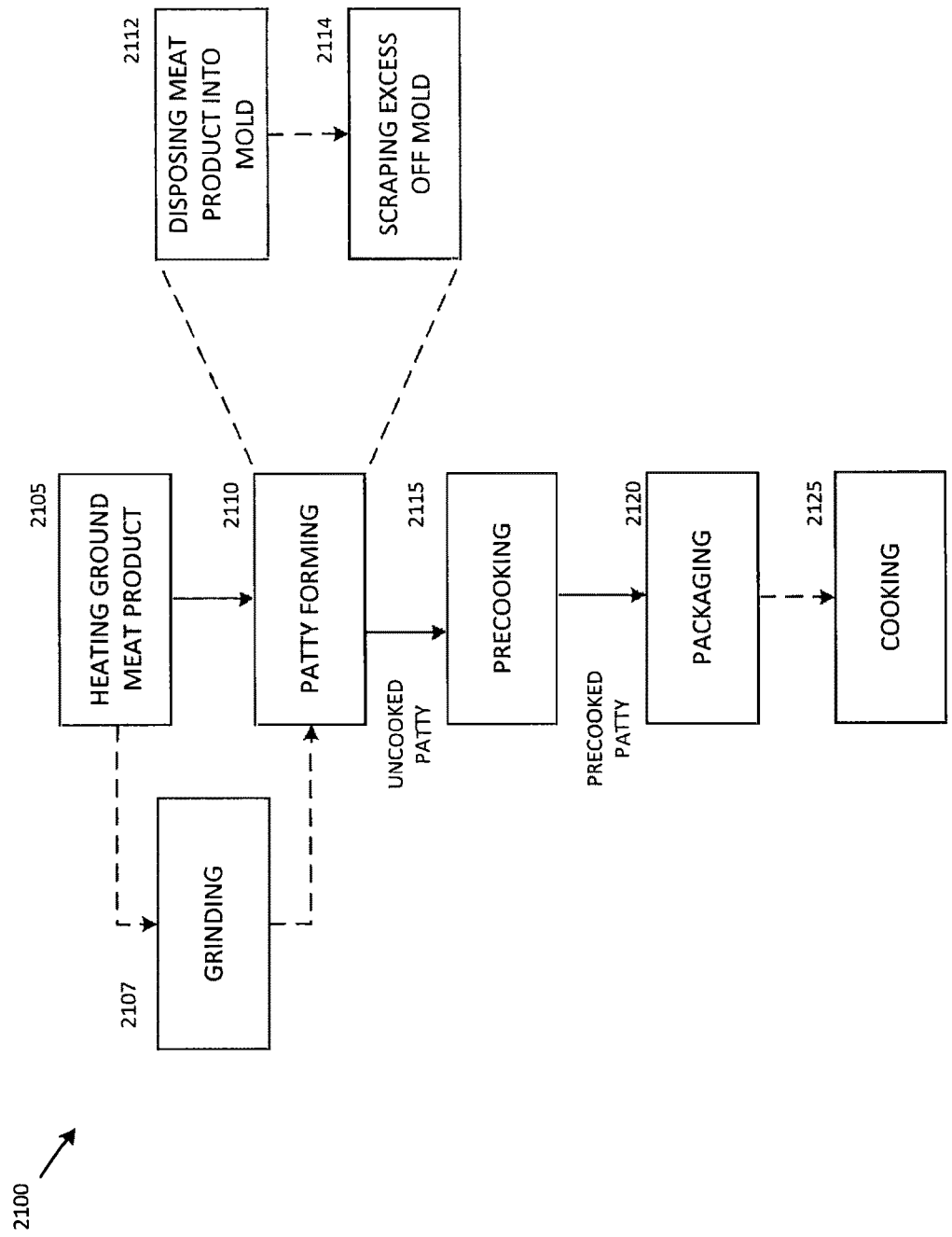
FIG. 21 is a flow diagram for a process in accordance with some embodiments.
Figure 22:
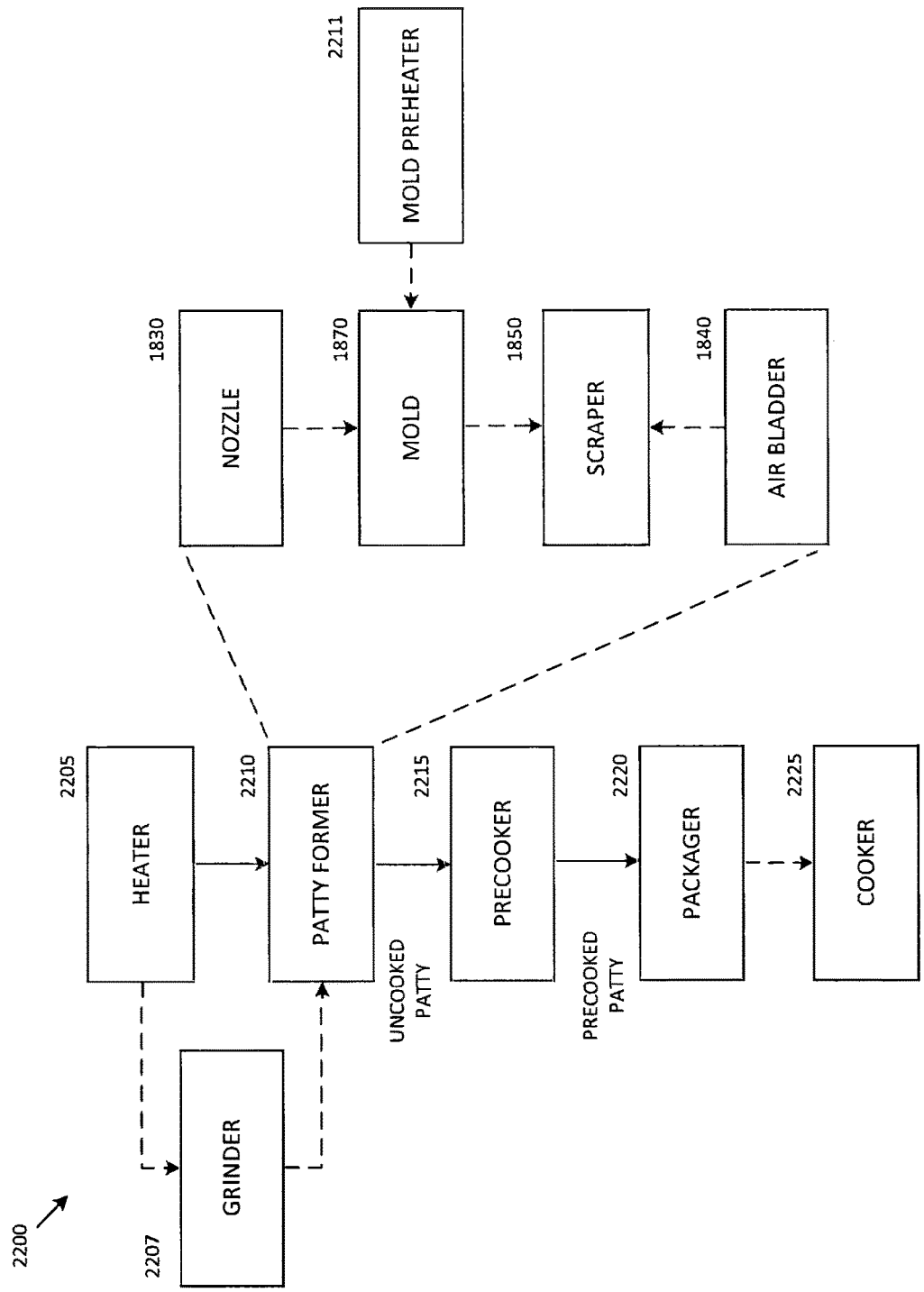
FIG. 22 is a block diagram of a system in accordance with some embodiments.

FIGS. 21-22 are a flow diagram for process 2100 and a block diagram for system 2200 in accordance with some embodiments. Ground meat product, which may include chicken, beef, turkey, pork, or combinations thereof, is heated (block 2105) at heater 2205, e.g., to a temperature greater than 32° F., in some cases between 35-90° F., and in some cases approximately 90° F. In some examples, for meat including chicken, beef, turkey, or combinations thereof, the meat is heated to a temperature between 30-50° F. In other examples, for meat including pork, beef, turkey, or combinations thereof, the meat may be heated to a temperature between 40-75° F. In yet another example, the meat includes pork and is heated to a temperature between 76-110° F.

The meat is optionally subjected to additional grinding (block 2107) at grinder 2207, and used for forming patties (block 2110) at patty former 2210. In an embodiment, patty former 2210 may include nozzle 1830, mold 1870, scraper 1850, and air bladder 1840 as shown in FIGS. 18A-18B. A mold preheater 2211 may also be used to preheat the patty molds. In some embodiments, mold preheater 2211 includes an induction coil located beneath the mold plate. By delivering controlled power to the induction coil, heat is generated in the mold plate that enables the denatured protein skin to form in the patty.

Patty formation may include disposing meat product into one or more patty molds (block 2112) using nozzle 1830, and scraping an excess portion of ground meat off the molds using scraper 1850 (block 2114). The uncooked patties produced by patty former 2210 are precooked (block 2115) at precooker 2215, thereby forming precooked patties having a skin comprising denatured protein. The skin is formed on at least a portion of the outside of the precooked patties, and at least a portion of the meat product beneath the skin is at the approximately the temperature to which the meat was heated (block 2105) at heater 2205. Precooking 2115 (at precooker 2215) may include applying infrared or inductive heating. The time duration for precooking 2115/2215 may be a function of the species of the meat, the thickness of the patty, the temperature of the precooking and/or the precooking method employed.

The precooked patties are optionally packaged (block 2120) at packager 2220 before being fully cooked (block 2125) at cooker 2225 such that they are suitable for human consumption. The temperature of the meat due to cooking 2125 may be between 150-180° F.

Figure 23:
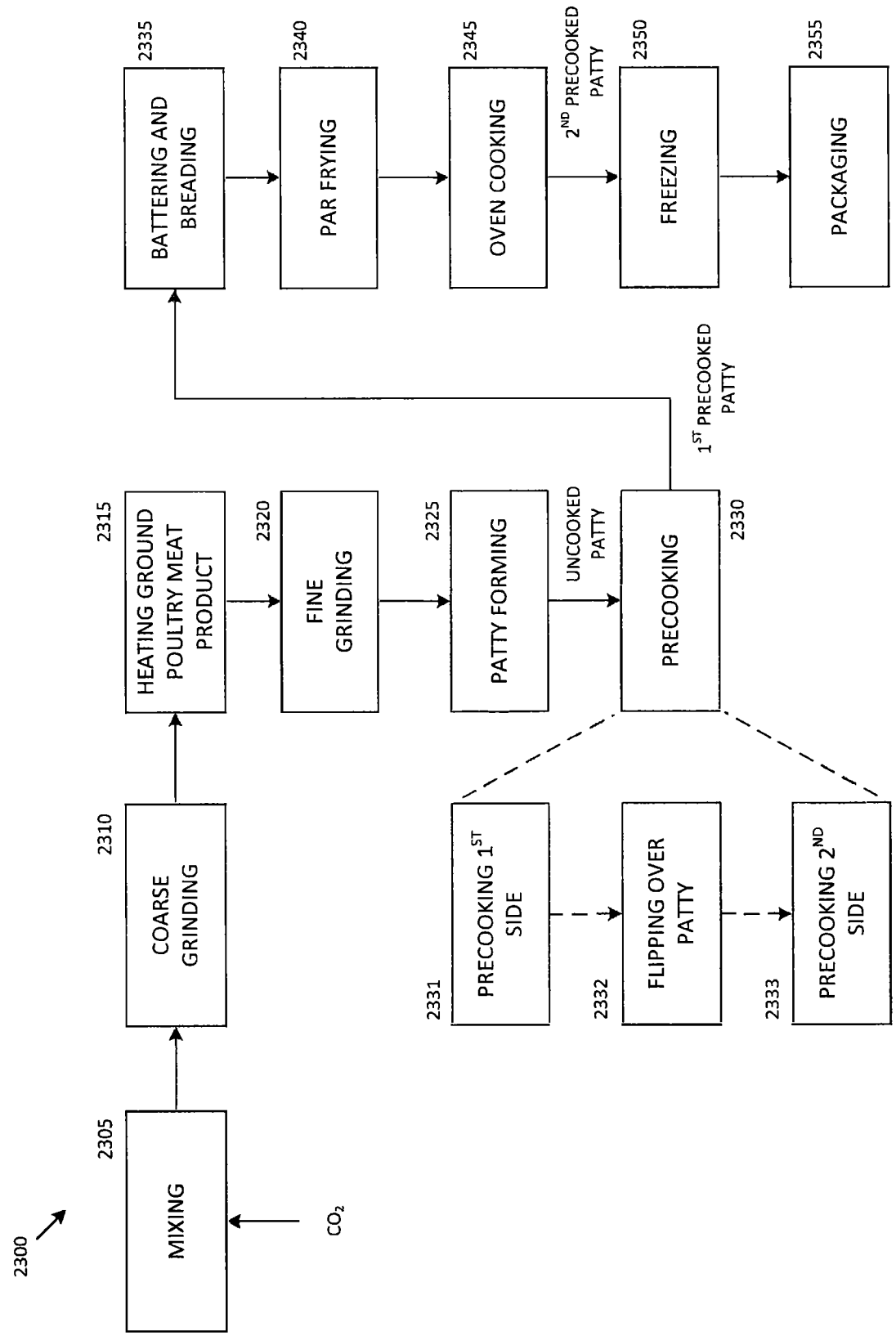
FIG. 23 is a flow diagram for a process in accordance with some embodiments.
Figure 24:
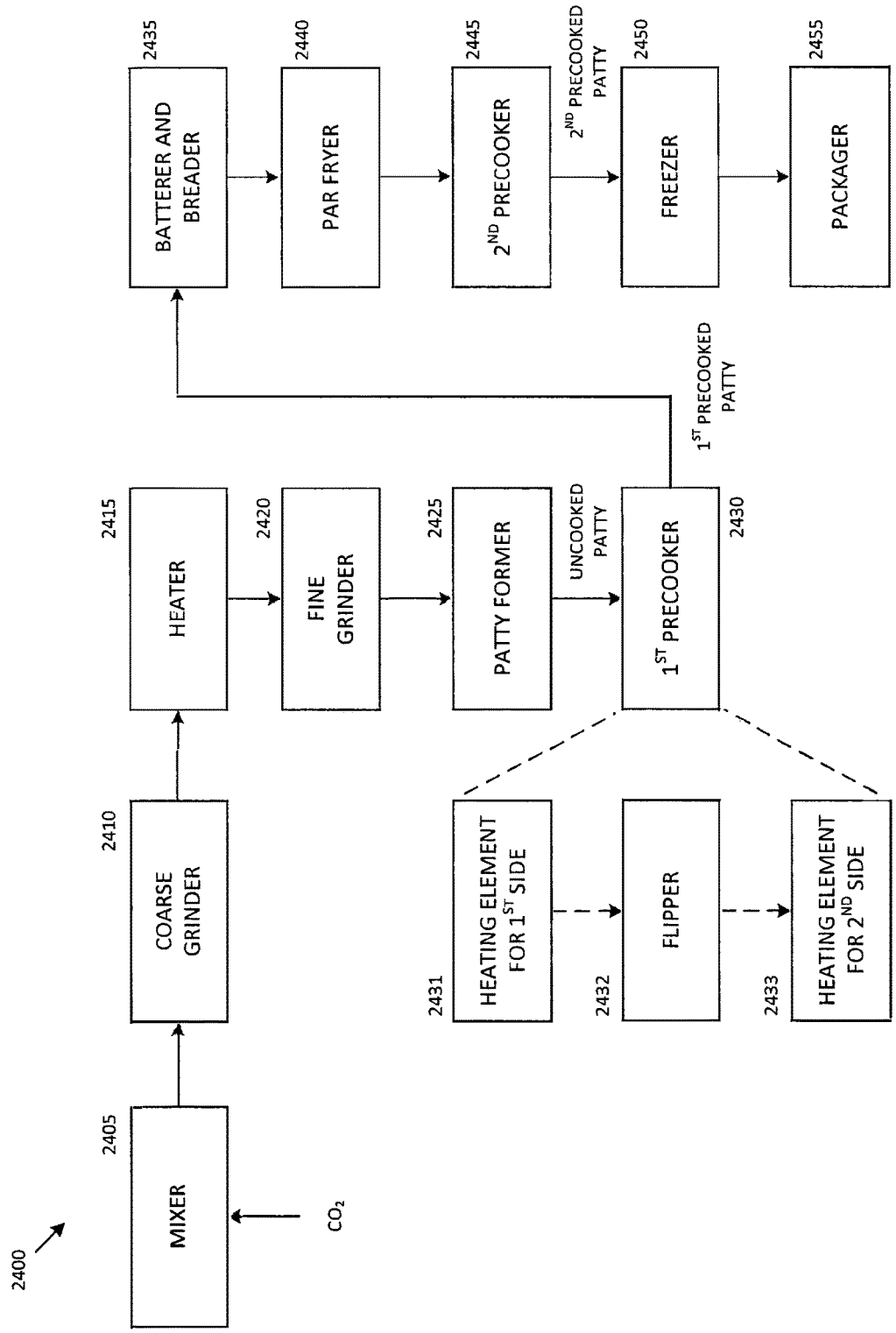
FIG. 24 is a block diagram of a system in accordance with some embodiments.

FIGS. 23-24 are a flow diagram for process 2300 and a block diagram for system 2400 in accordance with some embodiments. Meat (e.g., poultry meat product) is mixed (block 2305) at mixer 2405, which may involve chilling with a coolant such as gaseous $CO_2$, and then ground coarsely (block 2310) at coarse grinder 2410. The coarsely ground meat is heated (block 2315) at heater 2415 and then ground finely (block 2420) at fine grinder 2420. The finely ground meat is provided to patty former 2425, which forms patties (block 2325) that are precooked (block 2330) at precooker 2430. In an embodiment, precooking 2330 may include precooking a first side of each patty (block 2331) using a heating element 2431, flipping the patties over (block 2332) using flipper 2432, and precooking a second side of each patty (block 2333) using a heating element 2433. The precooked patties are processed by battering and breading (block 2335) at batterer/breader 2435, par fried (block 2340) at par fryer 2440, and fully cooked (block 2345) at a higher temperature than precooking 2330 at oven 2445. The fully cooked patties are frozen (block 2350) at freezer 2450 and packaged (block 2355) at packager 2455.

Figure 25:
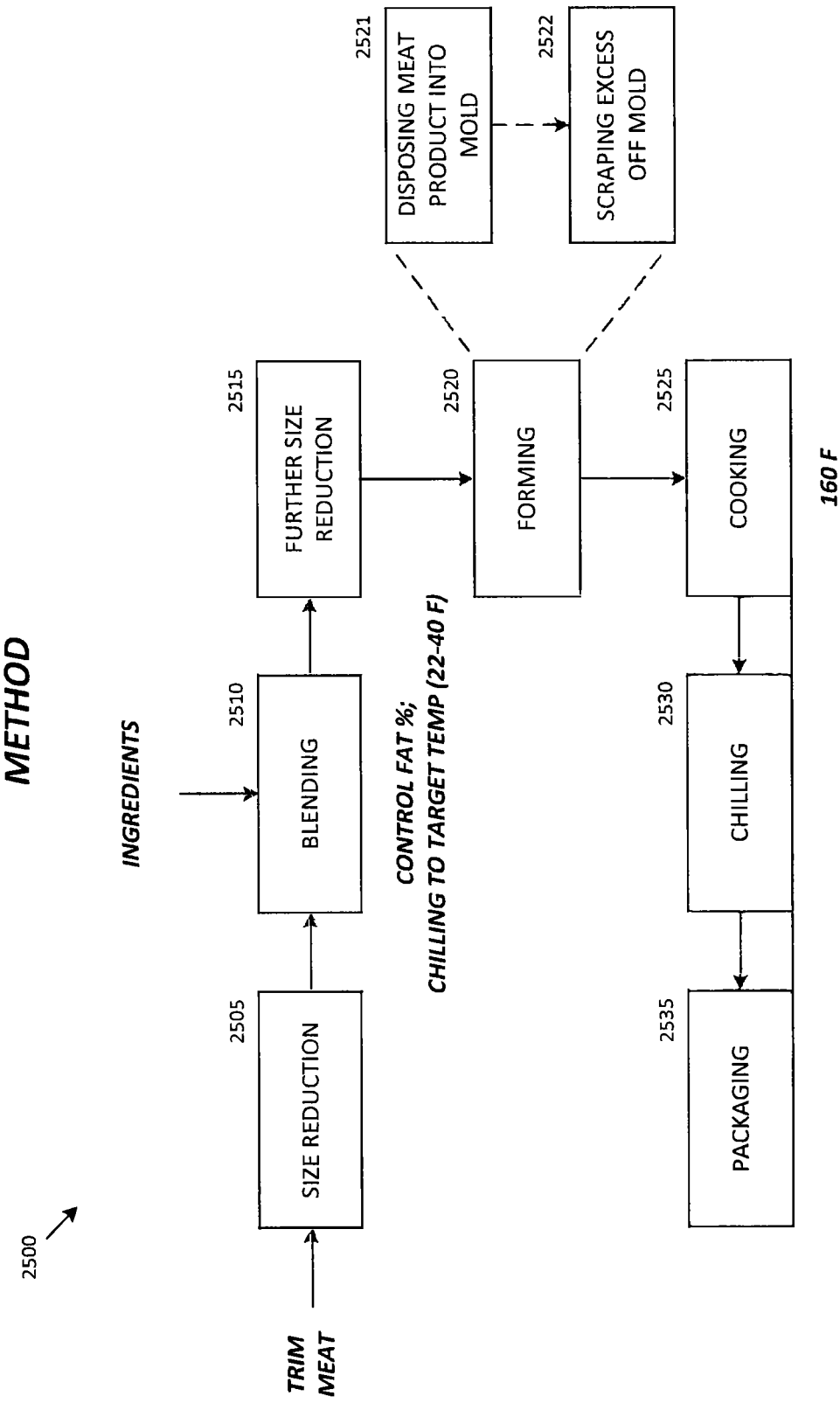
FIG. 25 is a flow diagram for a process in accordance with some embodiments.
Figure 26:
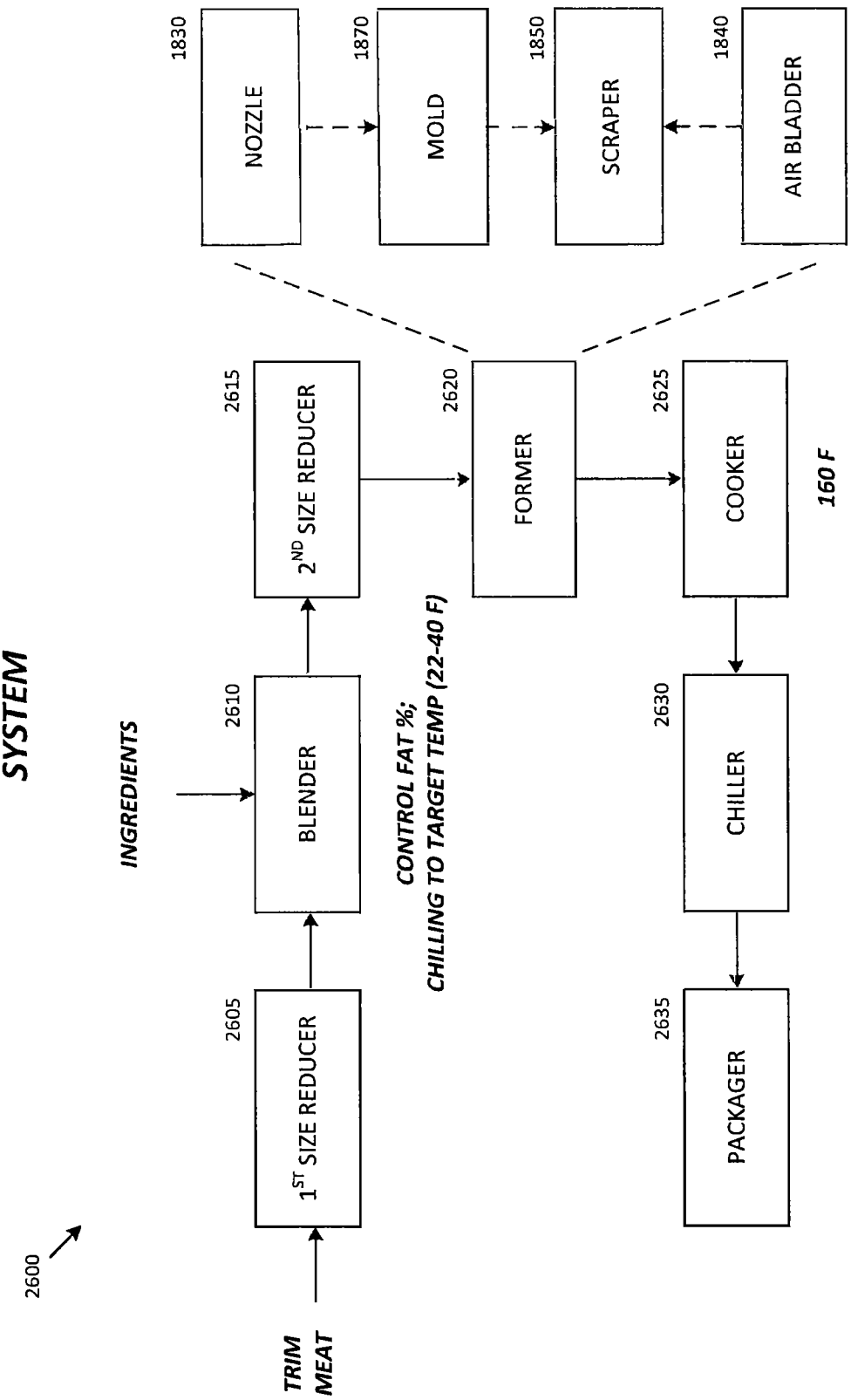
FIG. 26 is a block diagram of a system in accordance with some embodiments.

FIGS. 25-26 are a flow diagram for process 2500 and a block diagram for system 2600 in accordance with some embodiments. Unlike other examples involving warm forming disclosed herein, FIGS. 25-26 involve cold forming of meat patties, e.g., forming patties without a prior heating stage. Trim meat (e.g., including chicken, beef, turkey, pork, or combinations thereof) is reduced in size (block 2505) at a first size reducer 2605 and then blended (block 2510) with other ingredient(s) at blender 2610. The blending may control the fat percentage and may involve chilling to a target temperature, which may be less than 40° F., e.g., between 22-40° F. A further size reduction (block 2515) is performed at a second size reducer 2615, the output of which is passed to patty former 2620 to form patties (block 2520) at the target temperature resulting from the chilling.

In an embodiment, patty former 2620 includes a nozzle 1830, mold 1870, scraper 1850, and air bladder 1840. In some embodiments, mold 1870 includes a bottom and a side, and in other embodiments mold 1870 does not include a bottom. Patty formation includes disposing meat product into mold 1870 using nozzle 1830 (block 2521), and scraping an excess portion of ground meat off mold 1870 using scraper 1850 and air bladder 1840 (block 2522). Scraper 1850 may be engaged by inflating air bladder 1840. In some embodiments, mold 1870 is heated (e.g., using an induction coil) prior to disposing the ground meat product into the mold. In some embodiments, mold 1870 is heated using a first induction coil above the mold and a second induction coil below the mold.

The formed patties are cooked (block 2525) at cooker 2625, which may be an oven. In some embodiments, cooking the uncooked patties includes applying infrared or inductive heating to the uncooked patties. Cooking the patties forms a precooked patty having a skin of denatured protein. The skin is formed on at least an area on the outside of the precooked patty at a higher temperature (e.g., between 150-180° F.) than the temperature of a portion of the patty beneath the skin. The temperature of the portion of the patty beneath the skin may be approximately the target temperature. The time duration for cooking may be a function of the species of the meat, the thickness of the patty, the temperature of the precooking, and/or a cooking method employed.

The cooked patties are chilled (block 2530) at chiller 2630 and packaged (block 2535) at packager 2635.

Figure 27:
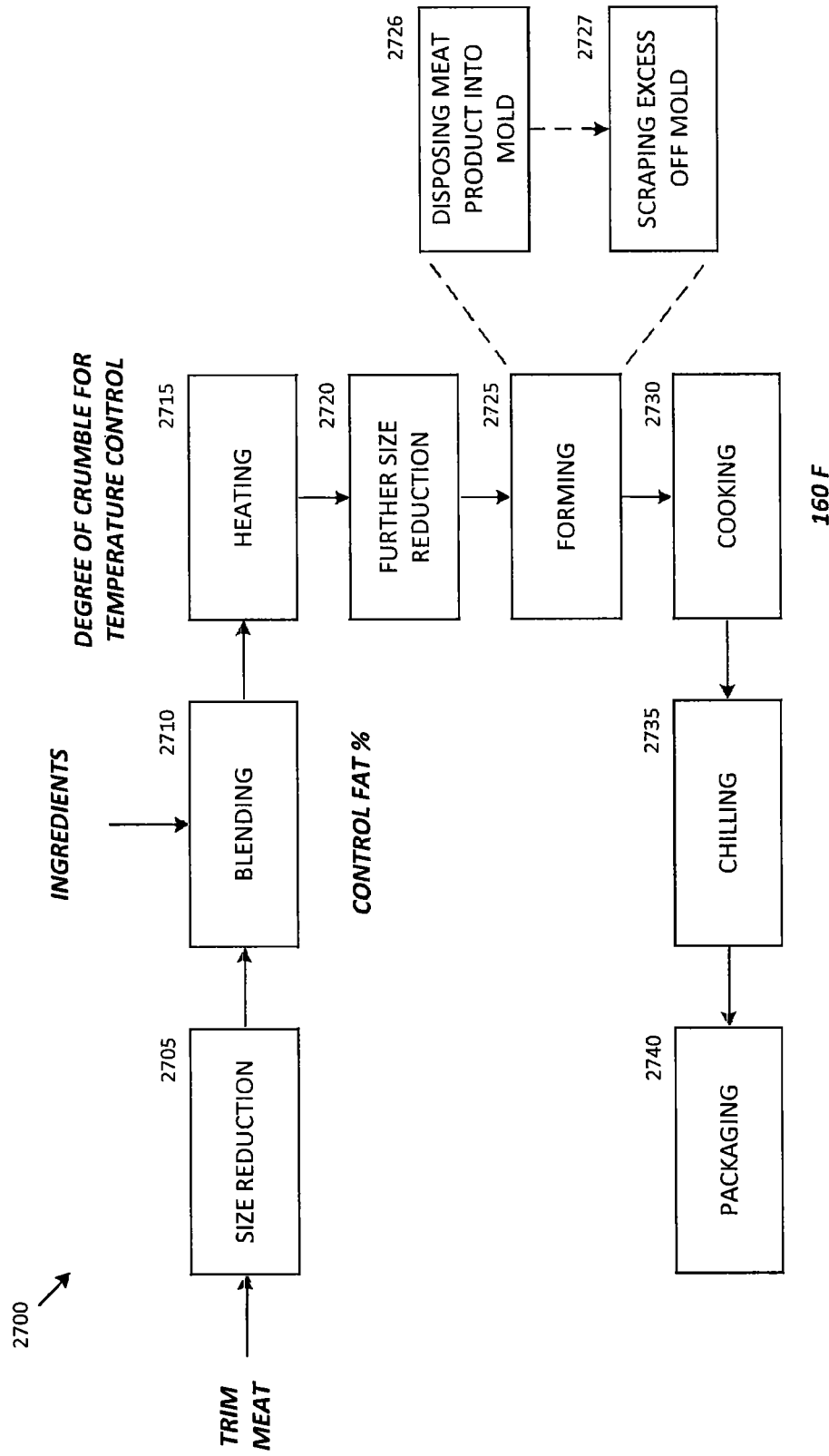
FIG. 27 is a flow diagram for a process in accordance with some embodiments.
Figure 28:
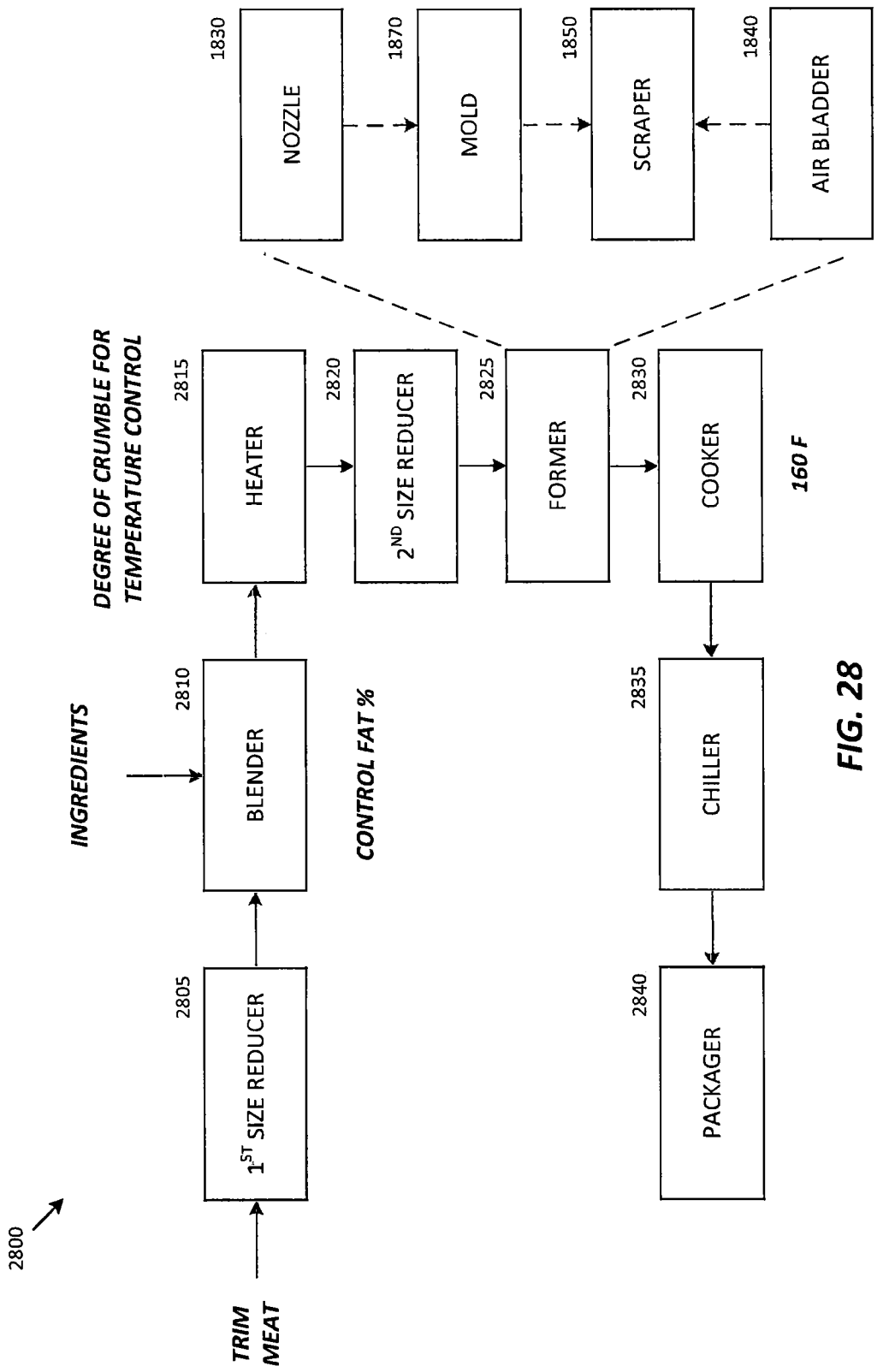
FIG. 28 is a block diagram of a system in accordance with some embodiments.

FIGS. 27-28 are a flow diagram for process 2700 and a block diagram for system 2800 in accordance with some embodiments. FIGS. 27-28 are similar in several respects to FIGS. 25-26 but involve warm forming instead of cold forming the patties, because heating (block 2715) at heater 2815 is performed before the patties are formed. Heating 2715 influences the texture of the patties, because the temperature for heating 2715 can be controlled to determine the degree of crumble of the patties. The temperature for optimal crumbliness depends on the meat species. In some embodiments, the temperature for heating 2715 is between 35-50° F. for chicken, beef, turkey, and combinations thereof. In other embodiments, the temperature for heating 2715 is between 46-75° F. for pork, turkey, beef, and combinations thereof. For example, pork may be heated to about 75° F., turkey may be heated to about 65° F., and beef may be heated to about 47° F. In another embodiment, the temperature for heating 2715 is between 76-95° F. for pork. Crumbliness may be determined by texture analysis of the patties. The remaining aspects of FIGS. 27-28 are the same as in FIGS. 25-26 and do not require further explanation.

Figure 29:
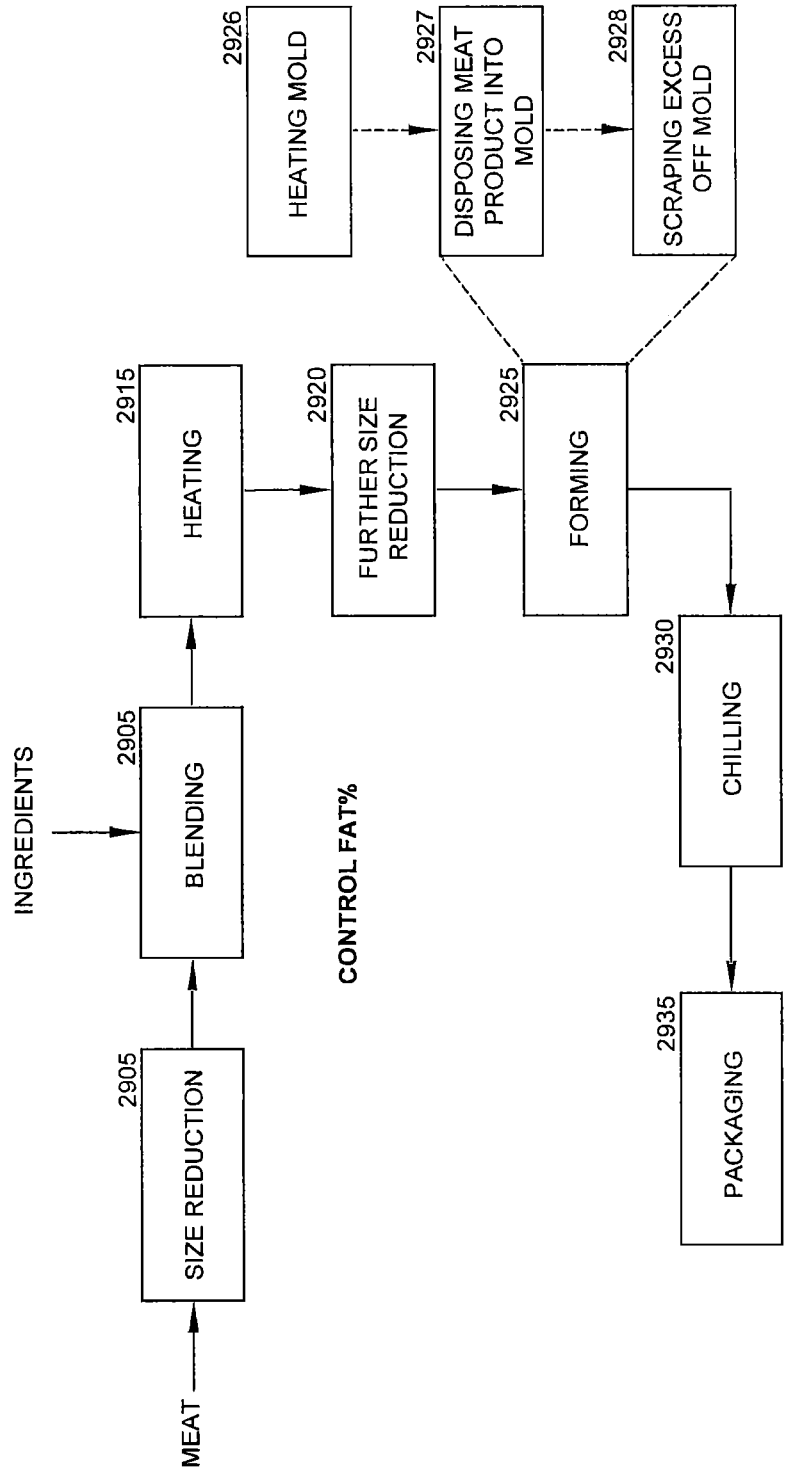
FIG. 29 is a flow diagram for a process in accordance with some embodiments.
Figure 30:
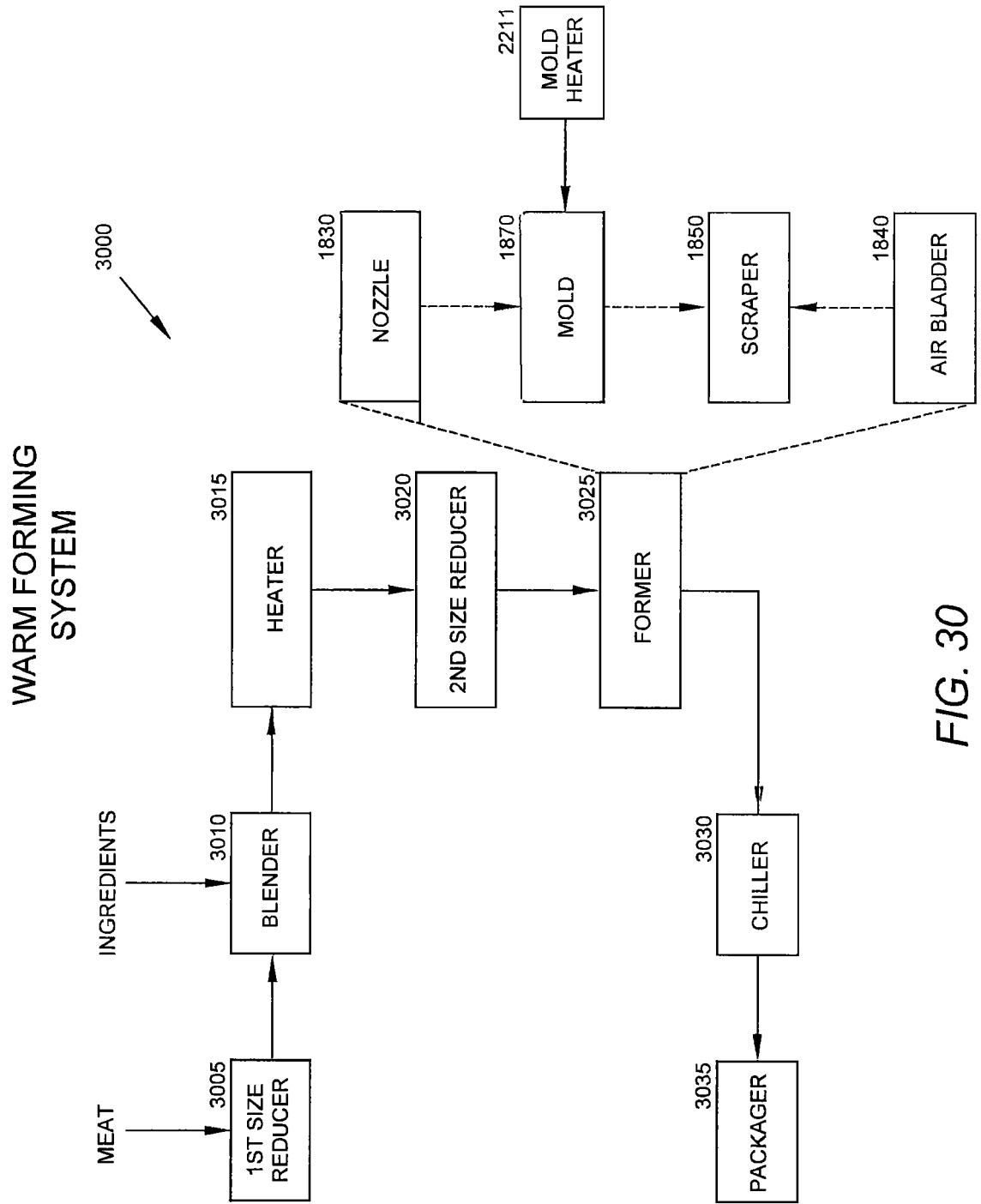
FIG. 30 is a block diagram of a system in accordance with some embodiments.

FIGS. 29-30 are a flow diagram for process 2900 and a block diagram for system 3000 in accordance with some embodiments. FIGS. 29-30 are similar in several respects to FIGS. 25-26 but do not involve a cooking stage between patty formation 2925 and chilling 2930. Additionally, patty mold 1870 is heated (block 2926) by mold heater 2211. The remaining aspects of FIGS. 29-30 are the same as in FIGS. 27-28 and do not require further explanation.

Figure 31:
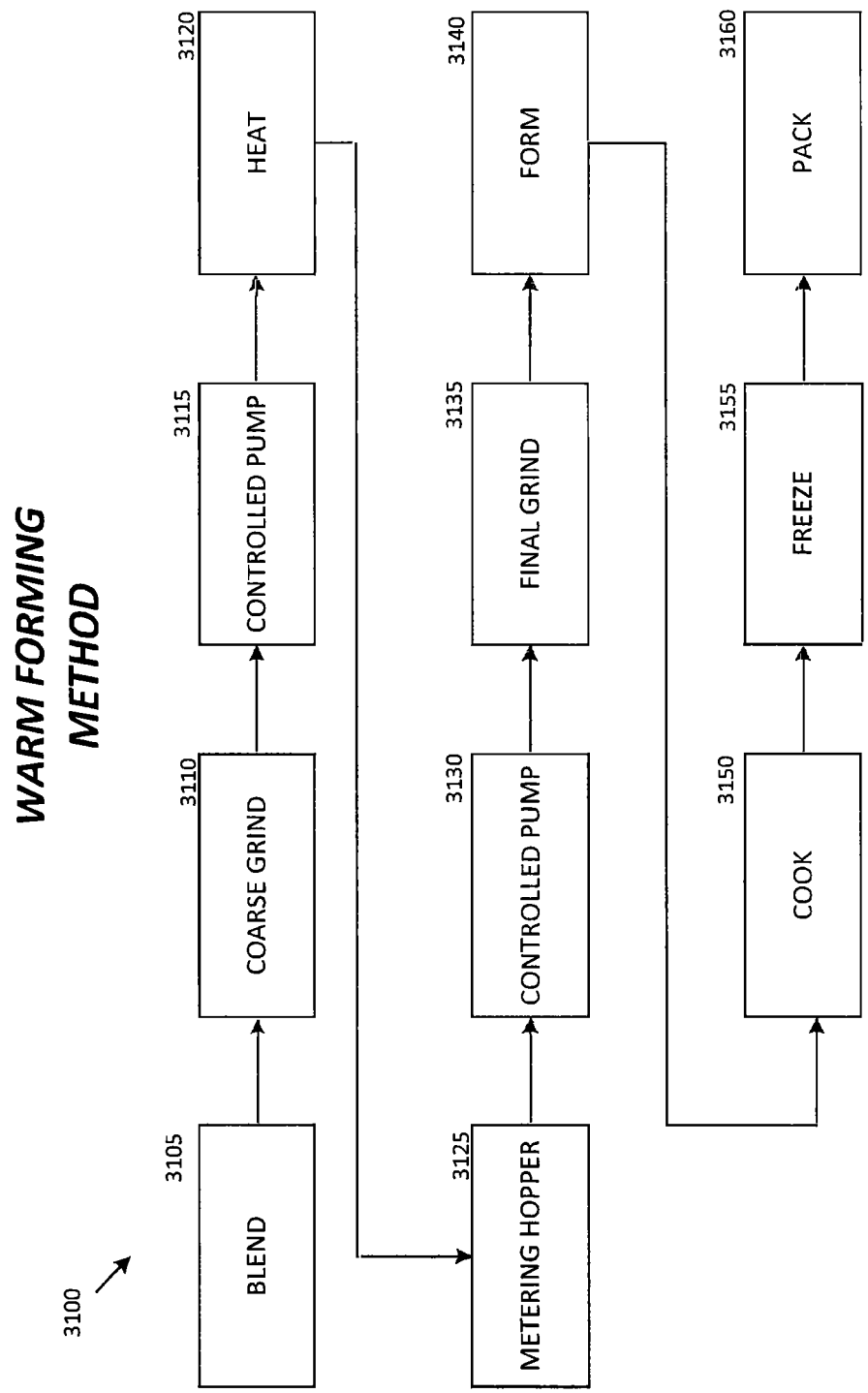
FIG. 31 is a flow diagram for a process in accordance with some embodiments.

FIG. 31 is a flow diagram of a process 3100 in accordance with some embodiments. One or more meat types are mixed (blending 3105), and seasoning ingredients may be added with additional mixing. Blending 3105 may involve chilling the blended materials. The blended meat product is coarsely ground (block 3110), and fed to a controlled pump 3115, which pumps the meat at a uniform rate to heater 3120, where the meat blend is warmed to a target temperature. The heated meat is deposited to a metering hopper 3125 and directed to a controlled pump 3130. Metering hopper 3125 is a hopper that acts as a buffer or accumulator to balance or smooth out momentary starts and stops in the production system without the need to shut down activities that are occurring upstream. In other words, metering hopper 3125 is a balancing mechanism.

Controlled pumping at controlled pump 3130 refers to maintaining consistent and stable pressure at the mold filling point. To accomplish this, the pump is operated intermittently. In other words, because the mold plates are moving on a conveyor there are times when there is no place for the meat material to flow, so if the pump were running continuously there would be buildup of pressure in the pipe because of compression of the meat material. Using controlled pumping, when the mold plate reaches the correct position, there is a place for the meat material to flow, so the pressure buildup is avoided. In some embodiments, when speed of the conveyor is changed and the mold plates are either moving faster under the filling nozzle or slower under the filling nozzle, the controlled pump 3115 accommodates for this change in speed. Thus, through controlled pumping overpressure situations (which would cause meat to leak out excessively) and underpressure situations (which would result in incomplete fills of the mold plate) are avoided.

The pumped meat from controlled pump 3130 is ground finely (block 3135) and directed to a former, where patties are formed (block 3140). After the patties are formed, the patties are cooked (block 3150), frozen (block 3155), and packaged (block 3160).

Although examples are illustrated and described herein, embodiments are nevertheless not limited to the details shown, since various modifications and structural changes may be made therein by those of ordinary skill within the scope and range of equivalents of the claims. Although certain details or parameters are described above in the context of particular figures, flow diagrams, or systems, such details or parameters may be applicable to other figures, flow diagrams, or systems.

What is claimed is:

1. An apparatus for producing a cooked meat patty, the apparatus comprising:
   a first grinder for coarse grinding a meat product wherein a coarse particle size of the meat product is in the range of ⅜ inch to ⅝ inch;
   a blender for blending the coarse ground meat product with first ingredients to a temperature $T_1$ wherein $30° F. \leq T_1 \leq 40° F.$;
   a second grinder for fine grinding the blended meat product wherein a fine particle size is less than the coarse particle size;
   a former for forming the fine ground meat product into an uncooked patty at temperature $T_1$ by depositing the ground meat product into a mold, wherein the mold does not include a top and does not include a bottom;
   a scraper for scraping an excess fine ground meat product off said mold, wherein the scraper includes an air bladder which inflates to engage the scraper;
   a precooker for precooking the uncooked patty in the mold to thereby form a precooked patty having a skin of depth D comprising denatured protein, wherein said skin is formed on at least an area on the outside of the precooked patty, and wherein at least a first portion of the meat product disposed beneath said skin is at temperature $T_1$; and
   a cooker for cooking the precooked patty to thereby form the cooked patty wherein said at least a first portion of the meat product is at a temperature $T_2$.

2. The apparatus of claim 1 further comprising:
   a freezer for freezing the cooked patty; and
   a packager for packaging the frozen cooked patty.

3. The apparatus of claim 1 wherein the ground meat product includes meat selected from the group consisting of: chicken, beef, turkey, pork, and combinations thereof.

4. The apparatus of claim 1 wherein a time duration for the precooker to precook the uncooked patty is a function of (a) a species of the meat, (b) a thickness of the patty, (c) a temperature of precooking, and (d) a type of precooker employed.

5. The apparatus of claim 1 wherein the ground meat product is selected from the group consisting of: chicken, pork, beef, turkey, and combinations thereof.

6. The apparatus of claim 1 wherein the precooker applies infrared heating to the uncooked patty.

7. The apparatus of claim 1 wherein the precooker applies inductive heating to the uncooked patty.

8. The apparatus of claim 1 wherein the precooker applies heat to the uncooked patty using a technique selected from the group consisting of: steam conduction heating, electric conduction heating, thermal oil conduction heating, application of a liquid, and combinations thereof.

9. An apparatus for producing a cooked meat patty, the apparatus comprising:
   a first grinder for coarse grinding a meat product wherein a coarse particle size of the meat product is in the range of ⅜ inch to ⅝ inch;
   a blender for blending the coarse ground meat product with first ingredients to a temperature $T_1$ wherein $22° F. \leq T_1 \leq 40° F.$;
   a second grinder for fine grinding the blended meat product wherein a fine particle size is less than the coarse particle size;
   a former for forming the fine ground meat product into an uncooked patty at temperature $T_1$ by depositing the ground meat product into a mold, wherein the mold does not include a top and does not include a bottom;
   a scraper for scraping an excess fine ground meat product off said mold, wherein the scraper includes an air bladder which inflates to engage the scraper;
   a precooker for precooking the uncooked patty in the mold to thereby form a precooked patty having a skin of depth D comprising denatured protein, wherein said skin is formed on at least an area on the outside of the precooked patty, and wherein at least a first portion of the meat product disposed beneath said skin is at temperature $T_1$; and
   a cooker for cooking the precooked patty to thereby form the cooked patty wherein said at least a first portion of the meat product is at a temperature $T_2$.

10. The apparatus of claim 9 further comprising:
    a freezer for freezing the cooked patty; and
    a packager for packaging the frozen cooked patty.

11. The apparatus of claim 9 wherein the ground meat product includes meat selected from the group consisting of: chicken, beef, turkey, pork, and combinations thereof.

12. The apparatus of claim 9 wherein a time duration for the precooker to precook the uncooked patty is a function of (a) a species of the meat, (b) a thickness of the patty, (c) a temperature of precooking, and (d) a type of precooker employed.

13. The apparatus of claim 9 wherein the ground meat product is selected from the group consisting of: chicken, pork, beef, turkey, and combinations thereof.

14. The apparatus of claim 9 wherein the precooker applies infrared heating to the uncooked patty.

15. The apparatus of claim 9 wherein the precooker applies inductive heating to the uncooked patty.

16. The apparatus of claim 9 wherein the precooker applies heat to the uncooked patty using a technique selected from the group consisting of: steam conduction heating, electric conduction heating, thermal oil conduction heating, application of a hot liquid, and combinations thereof.

17. An apparatus for cold forming a meat patty, the apparatus comprising:
    a first grinder for coarse grinding a meat product wherein a coarse particle size of the meat product is in the range of ⅜ inch to ⅝ inch;
    a blender for blending the coarse ground meat product with first ingredients to a temperature $T_1$ wherein $22° F. \leq T_1 \leq 40° F.$;
    a second grinder for fine grinding the blended meat product wherein a fine particle size is less than the coarse particle size;
    a former for forming the fine ground meat product into an uncooked patty at $T_1$ by depositing the ground meat product into a mold, wherein the mold does not include a top and does not include a bottom;

a scraper for scraping an excess fine ground meat product of said mold, wherein the scraper includes an air bladder which inflates to engage the scraper; and a precooker for precooking the uncooked patty to thereby form a precooked patty having a skin of depth D comprising denatured protein, wherein said skin is formed on at least an area on the outside of the precooked patty at a temperature $T_2$, and wherein at least a first portion of the meat product disposed beneath said skin is at temperature $T_1$, and wherein $T_2 > T_1$.

18. The apparatus of claim 17 further comprising:
a chiller for chilling the precooked patty; and
a packager for packaging the precooked patty.

19. The apparatus of claim 17 wherein the meat product includes meat selected from the group consisting of: chicken, beef, turkey, pork, and combinations thereof.

20. The apparatus of claim 17 wherein a time duration for the precooker to precook the uncooked patty is a function of (a) a species of the meat, (b) a thickness of the patty, (c) a temperature of cooking, and (d) a type of precooker employed.

21. The apparatus of claim 17 wherein the precooker applies infrared heating to the uncooked patty.

22. The apparatus of claim 17 wherein the precooker applies inductive heating to the uncooked patty.

23. The apparatus of claim 17 further comprising a heater for heating said mold prior to disposing the ground meat product into said mold.

24. The apparatus of claim 23 wherein said heater is an induction coil.

25. The apparatus of claim 23 wherein said heater comprises a first induction coil above said mold and a second induction coil below said mold.

* * * * *